(12) United States Patent
Demmer et al.

(10) Patent No.: US 11,775,137 B2
(45) Date of Patent: Oct. 3, 2023

(54) CONNECTIONS INTERFACE FOR COMMUNICATION PLATFORM

(71) Applicant: Salesforce, Inc., San Francisco, CA (US)

(72) Inventors: Michael Demmer, San Francisco, CA (US); Samir Ketema, El Cerrito, CA (US); Yoav Sion, San Francisco, CA (US); Julie Cockle, San Francisco, CA (US); Rohit Agarwal, Everett, WA (US); Preetham Deshikachar Shrinivas, Walnut Creek, CA (US); Ryan David Morris, Almeda, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/358,879

(22) Filed: Jun. 25, 2021

(65) Prior Publication Data

US 2022/0413659 A1 Dec. 29, 2022

(51) Int. Cl.
*G06Q 10/10* (2023.01)
*G06F 3/0482* (2013.01)
(Continued)

(52) U.S. Cl.
CPC ............ *G06F 3/0482* (2013.01); *G06F 9/542* (2013.01); *H04L 51/04* (2013.01)

(58) Field of Classification Search
CPC ....... G06F 3/0482; G06F 9/542; H04L 51/04; G06Q 10/103; G06Q 10/1095
See application file for complete search history.

(56) References Cited

U.S. PATENT DOCUMENTS

| 8,219,689 B2 * | 7/2012 | Kumar | G06Q 30/02 709/227 |
| 9,026,921 B2 * | 5/2015 | Shi | G06Q 10/103 715/751 |

(Continued)

OTHER PUBLICATIONS

Brownell, Joseph, "Respond to Meeting Requests in Outlook—Instructions," Jul. 8, 2018, Available https://web.archive.org/web/20170708113826/https://www.teachucomp.com/respond-to-meeting-requests-in-outlook-instructions/ (Year: 2017).*

(Continued)

*Primary Examiner* — Alvin H Tan
(74) *Attorney, Agent, or Firm* — Lee & Hayes, P.C.

(57) ABSTRACT

Techniques are described for providing an interface for managing invitations to communicate via a communication platform. In an example, a first user can access a first interface to invite a second user to communicate via the communication platform. In response to input from the first user via the first interface, the communication platform can generate an invitation for the second user to communicate with the first user and can provide the invitation to the second user, such as by causing the invitation to be presented via a second interface. The second user can submit a response to the invitation via the second interface. The communication platform can update the first interface and the second interface based on response, such as, in examples in which the second user accepts the invitation, to reflect a newly established connection between the first user and the second user.

20 Claims, 10 Drawing Sheets

(51) Int. Cl.
*H04L 51/04* (2022.01)
*G06F 9/54* (2006.01)

(56) References Cited

U.S. PATENT DOCUMENTS

| | | | | |
|---|---|---|---|---|
| 10,389,769 | B2* | 8/2019 | Gudipaty | H04L 65/403 |
| 2004/0228531 | A1* | 11/2004 | Fernandez | H04L 51/04 |
| | | | | 382/187 |
| 2010/0088246 | A1* | 4/2010 | Lim | G06Q 30/0601 |
| | | | | 705/319 |
| 2015/0235289 | A1* | 8/2015 | Jeremias | G06Q 30/0625 |
| | | | | 705/26.41 |
| 2018/0287982 | A1 | 10/2018 | Draeger et al. | |
| 2019/0205564 | A1* | 7/2019 | Song | H04L 51/52 |
| 2021/0271495 | A1* | 9/2021 | Smith | G06F 3/04812 |

OTHER PUBLICATIONS

Dex How To Tutorials, "How To Accept An Invite on Google Hangouts for iPad Tutorial," Aug. 26, 2020, Available https://youtu.be/n_TC2OFhOII (Year: 2020).*

U.S. Appl. No. 16/993,859, filed Aug. 14, 2020, Butterfield, et al., "Electronic Board Associated With a Communication Platform", 45 pages.

U.S. Appl. No. 17/111,408, filed Dec. 3, 2020, Khosrowshahi, "Integrating a Third-Party Platform Into a Communication Platform", 53 pages.

U.S. Appl. No. 17/163,017, filed Jan. 29, 2021, McCue, et al., "Utilizing Message Metadata for Improving User Interface Presentation", 72 pages.

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advancelexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

CONNECTIONS INTERFACE FOR COMMUNICATION PLATFORM

TECHNICAL FIELD

Communication platforms are becoming increasingly more popular for facilitating communications between two or more people, such as to collaborate on a project, plan an event, or the like. A user of a communication platform may invite other people to join a collaboration effort. The other people can include other users of the communication platform with whom the user does not have an established connection and/or others who are not associated with the communication platform. The user can request that the communication platform generate an invitation to another person to communicate via the communication platform and send the invitation to the other person. Oftentimes, the communication platform sends the invitation via a third-party application, such as via email or the like, requiring the other user to leave the communication platform, sign in to the third-party application, and access the particular message with the invitation in order to accept the invitation and connect via the communication platform. This process can be onerous for the invitee and can result in a negative user experience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
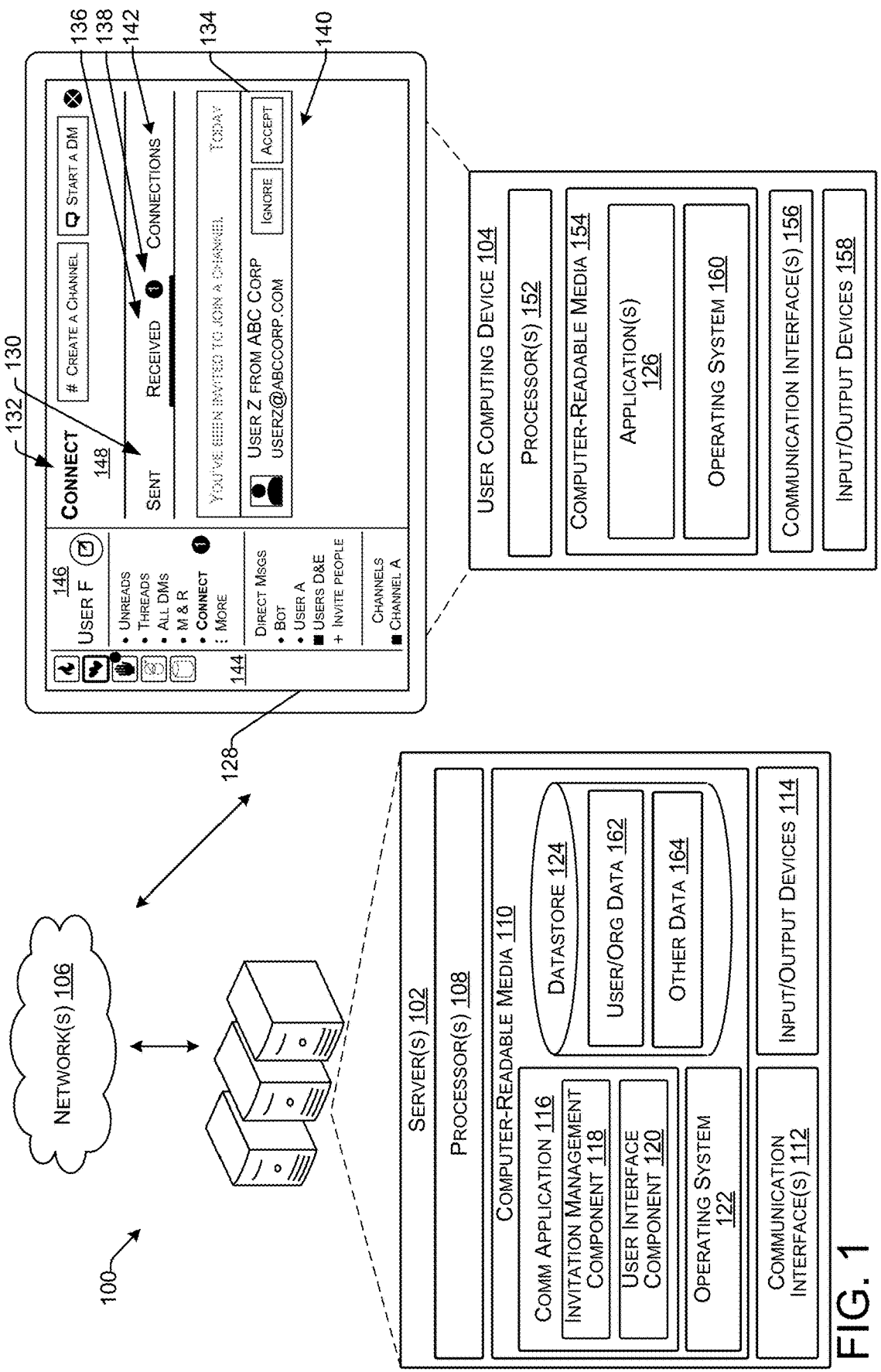
FIG. 1 illustrates a block diagram illustrating an example system of computing devices usable to implement example techniques described herein.

Techniques for describing an interface for managing invitations to communicate via a communication platform are described herein. The communication platform can be a group-based communication platform, a channel-based messaging platform, and/or any other platform for facilitating communication between and among users. In an example, a first user can access a first instance of an interface to invite a second user to communicate via the communication platform. In response to input from the first user via the first instance of the interface, the communication platform can generate an invitation for the second user to communicate with the first user and can provide the invitation to the second user, such as by causing the invitation to be presented via a second instance of the interface. The second user can submit a response to the invitation via the second instance of the interface. The communication platform can update the first instance of the interface and the second instance of the interface based on the response, such as, in examples in which the second user accepts the invitation, to reflect a newly established connection (e.g., new communication object) between the first user and the second user.

In existing technologies, a first user can submit a request for the communication platform to generate an invitation for a second user to communicate with the first user via the communication platform. The request can include contact information associated with the second user, such as an email address, phone number, or the like. The communication platform can generate and send the invitation to the second user based on the contact information, such as via a third-party email application, a text message, or the like. To access the invitation, the second user utilizing the traditional system would be required to leave the communication platform, open an alternative means of communication (e.g., third-party email application, text messages, etc.), and access a message with the invitation included. This is an inefficient process that requires additional computing resources and provides a poor user experience.

Techniques described herein are directed to providing an interface for efficiently managing invitations to communicate via a communication platform. In at least one example, the interface can include a means by which a first user can submit a request to generate an invitation to communicate with a second user via a communication object associated with the communication platform. The communication object can be a virtual space to enable users to chat, meet, call, collaborate, transfer files or other data, or otherwise communicate between and among each other. In other words, the communication object can be configured to facilitate communication between at least the first user and the second user. The request can include a request to communicate via a particular type of communication object (e.g., communication channel, direct messaging instance, audio or video conversation, etc.). For example, the interface can include an option to invite another user to communicate via a direct messaging instance. For another example, the interface can include an option to invite the other user to communicate via a communication channel (also referred to herein as a "channel").

Based on the request, the communication platform can generate and send the invitation to the second user. In response to sending the invitation, the communication platform can cause a first instance of the invitation to be presented via a first instance of the interface associated with the first user, such as in a sent invitations element (or tab, section, etc.) of the first instance of the interface. In some examples, the sent invitations element can include an interface element that provides an associated user with a list of one or more pending invitations (e.g., sent but not yet accepted or declined) generated by the communication platform based on request(s) submitted by the associated user. In various examples, the first instance of the invitation can include data associated with the invitation, such as one or more recipients of the invitation, a first time associated with invitation delivery, a second time associated with invitation viewing (e.g., by the second user), a status of the invitation (e.g., pending, accepted, declined, etc.), and the like. In at least one example, the sent invitations element of the interface can enable the first user to monitor a status of one or more pending invitations generated on behalf of the first user and provided to other users.

Additionally, based on the request, the communication platform can cause a second instance of the invitation to be presented via a second instance of the interface associated with the second user, such as in a received invitations element (or tab, section, etc.) of the interface. In various examples, the received invitations element can include an interface element that provides an associated user with a list of one or more pending invitations received by the associated user via the communication platform. In various examples, the second instance of the invitation can include data associated with the invitation, such as a name (e.g., real name, username, etc.) associated with a sending user of the invitation, user data associated with the sending user (e.g., contact information, associated organization, associated workspace, etc.), a time associated with receipt of the invitation, a communication object type associated with the invitation, a message intended for the recipient, and the like. In some examples, the second instance of the invitation can have associated therewith a notification, badge, or the like configured to provide an indication that a new invitation has been received. In at least one example, the received invitations element of the interface can enable the second user to access the invitation received from the first user and/or one or more other invitations received from one or more other users of the communication platform.

In at least one example, the second instance of the invitation can include a selectable control to accept or decline the invitation. In various examples, in response to receiving an indication of selection of a selectable control to decline the invitation, the communication platform can update the first instance of the interface and/or the second instance of the interface to reflect that the second user declined the invitation. For example, the communication platform may remove the first instance of the invitation from the sent invitations element of the first instance of the interface and the second instance of the invitation from the received invitations element of the second instance of the interface.

In examples in which the invitation is associated with an existing communication object (e.g., communication object between the first user and other users to which the first user invites the second user to join), in response to receiving an indication of acceptance of the invitation (e.g., an indication of selection of a selectable control to accept the invitation), the communication platform can associate the second user with the existing communication object. In examples in which the invitation is associated with a new communication object (e.g., to be generated based on the invitation), in response to receiving the indication of acceptance of the invitation, the communication platform can send, to a user computing device associated with the second user (e.g., via the second instance of the interface or another interface), a request to input one or more characteristics to be associated with the new communication object. The characteristic(s) can include a workspace, team, or group with which to associate the new communication object, a name or other identifier (e.g., image, GIF, etc.), privacy settings (e.g., public, private, etc.), shortcuts, files, and/or other details to associate with the new communication object.

In various examples, in response to receiving the indication of acceptance of the invitation and/or the characteristic(s) associated with the communication object, the communication platform can generate a communication object (e.g., communication channel, direct messaging instance) associated with the invitation. In some examples, the communication object can be generated based in part on the characteristic(s). In at least one example, the communication platform can update the first instance of the interface and the second instance of the interface to reflect the acceptance of the invitation and/or the newly generated communication object. For example, based in part on receiving the indication of acceptance of the invitation, the communication platform can remove the first instance of the invitation from the sent invitations element of the first instance of the interface and/or the second instance of the invitation from the received invitations element of the second instance of the interface.

In various examples, based in part on receiving the indication of acceptance of the invitation, the communication platform can cause an instance of the communication object to be presented via the first instance of the interface and/or the second instance of the interface, such as in a connection element of respective instances of the interface. In some examples, the connection element can provide a list of one or more communication objects generated based on requests submitted via the interface. In some examples, the connection element can provide a list of one or more communication objects associated with a respective user that have been recently generated by the communication platform (e.g., based on request submitted via the interface and/or generated via another interface of the communication platform). In such examples, the communication object(s) associated with the list can include one or more communication object that were generated within a threshold period of time (e.g., within the past day, week, month, etc.). In at least one example, the connection element of the interface can enable a user to view information about and/or access (e.g., via a selectable control) communication objects associated with the user.

Additionally or in the alternative, in some examples, the communication platform can provide the invitation to the second user via an alternative means of communication, such as via email, text message, networking message, or the like. In some examples, the alternative means of communication can include a third-party application, such as a third-party email application, third-party networking application, or the like. In some examples, the invitation may include a link (e.g., hyperlink, URL, etc.) that is selectable to access the invitation. In such examples, the second user can select the link to access the invitation and submit a first input to accept or decline the invitation and, in some examples, a second input associated with characteristics of an associated communication object. Based on the received input, the communication platform can update the first instance of the interface and the second instance of the interface, as described above.

The techniques described herein improve performance of a user computing device by reducing a number of applications and/or programs running thereon in order to establish a connection via a communication platform. As discussed above, in existing systems, the communication platform receives a request, from a first user, to provide an invitation for a second user to communicate with the first user via the communication platform. The communication platform generates the invitation and sends the invitation to the second user via an alternate means of communication, such as via an email, text, social networking message, or the like. In some examples, existing systems provide the invitation to the second user via one or more third-party applications. These alternate means of communications (e.g., third-party applications, text messaging, etc.) may require additional processing power and memory to continually update on the user computing device concurrently with a communication application associated with the communication platform. Unlike these traditional systems, the techniques described herein include providing access to the invitation via a user interface associated with the communication platform (e.g., the communication application). As such, a user computing device associated with the second user may run a single communication application associated with the communication platform, and the second user may access and accept (or decline) a pending invitation via the communication application. Due to the ease of access to the invitations via the user interface of the communication application, the techniques described herein may improve the user computing device by reducing an amount of processing power and memory required to access and respond to invitations.

Additionally, the techniques described herein can improve information security and decrease a risk of potential fraud. As discussed above, in traditional systems, a user can receive an invitation to communicate via a third-party application, such as an email application or the like. The user may then accept the invitation to communicate by clicking on a link or other selectable control associated with the email message including the invitation. However, such techniques can be subject to potential fraud and/or security risks. The techniques described herein enable users to receive and accept invitations to communicate without leaving a communication application associated with the communication platform. By remaining in the communication application, the risk of fraud and/or security risks can be significantly reduced, if not eliminated. As such, the techniques described herein improve information security and decrease a potential for fraudulent activity with regard to the communication platform.

Furthermore, the techniques described herein provide a better user experience for users associated with a communication platform. In existing systems, a first user may submit a request to invite a second user to communicate via the communication platform and, after submitting the request, may not be privy to the status of the invitation. For example, in some examples, the first user may determine that the invitation is accepted only when a new communication channel or direct messaging instance with the second user is displayed in association with a user account. Unlike the existing system, the techniques described herein may improve the user experience of the first user by providing a status instance of pending and accepted invitations, to inform the first user of a status associated a particular invitation. Also, as discussed above, traditionally, a second user receiving an invitation may only be notified that the invitation exists by accessing an alternate means of communication, such as by checking email, text messages, social networking messages, or the like. As such, to access the invitation, the second user leaves the communication platform, accesses the alternate means of communication, and responds to the invitation. Unlike the traditional system, the techniques described herein provide an expedited means of enabling communications via the communication platform without the onerous process of leaving the communication platform and accessing an alternate means of communication in order to respond to the invitation. As such, the techniques described herein may provide an enhanced user experience.

These and other aspects are described further below with reference to the accompanying drawings. The drawings are merely example implementations and should not be construed to limit the scope of the claims. For example, while some examples are illustrated in the context of a user interface for a mobile device, the same or similar techniques may be implemented using any computing device and the user interface may be adapted to the size, shape, and configuration of the particular computing device.

FIG. 1 illustrates an example system 100 for performing techniques described herein. In at least one example, the example system 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples the communication platform is a channel-based messaging platform. In some examples, such groups of users can be defined by group identifiers, which can be associated with common access credentials, domains, or the like. In some examples, the communication platform can be a hub, offering a secure and private virtual space to enable users to chat, meet, call, collaborate, transfer files or other data, or otherwise communicate between or among each other. In some examples, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example system 100 can include one or more server computing devices (or "server(s)") 102. In at least one example, the server(s) 102 can include one or more servers or other types of computing devices that may be embodied in any number of ways. For example, in the example of a server, the functional components and data can be implemented on a single server, a cluster of servers, a server farm or data center, a cloud-hosted computing service, a cloud-hosted storage service, and so forth, although other computer architectures may additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example system 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and may include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which may program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that may be used to store the desired data and that may be accessed by a computing device. Depending on the configuration of the server(s) 102, the computer-readable media 110 can be a type of computer-readable storage media and/or may be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include an invitation management component 118, a user interface component 120, an operating system 122, and a datastore 124.

The communication application 116 can enable interaction of content among user computing devices 104, such as via one or more applications 126. In at least one example, the one or more applications 126 can include a communication client application. For example, content (e.g., messages including text, images, audio, video, etc.) can be shared among users associated with user accounts of an online communication network provided by the communication platform system and may include sharing content via a communication object (e.g., a channel, a direct messaging instance, a board, an audio or video conversation, etc.). The communication object can be configured to facilitate communication between at least two users of the communication platform.

In at least one example, the communication application 116 can enable content sharing between at least a first user and a second user via a communication object that is generated via an interface configured to enable a quick and efficient connection between at least the first user and the second user. In some examples, the content can be accessible via the one or more applications 126, such as a communication client application, associated with the user computing device 104. The application(s) 126 can include native applications and/or a web-based applications. In some examples, the application(s) 126 can enable interfaces to access content, to view content, and to generate content (e.g., invitations), such as those described with reference to FIGS. 2A-5, for example. In particular examples, server(s) 102 can send instructions to present, transmit, and receive content as discussed with reference to FIGS. 2A-5.

In various examples, the invitation management component 118 can be configured to receive, from a first user account associated with a first user (e.g., via a communication client application of the application(s) 126), a request to generate an invitation to communicate with a second user via a communication object of the communication platform. In some examples, the communication object can include an existing communication object (e.g., a previously generated communication object associated with the first user account and one or more other user accounts). In some examples, the request to generate the invitation can include a request to generate a new communication object. In such examples, the request can include a particular type of communication object (e.g., communication channel, direct messaging instance, audio or video conversation, etc.) to be associated with the invitation. For example, the request can include a request to invite the second user to communicate via a direct messaging instance. For another example, the request can include a request to invite the second user to communicate via a communication channel.

Based on the request, the invitation management component 118 can generate and send the invitation to the second user. In some examples, in response to the invitation management component 118 sending the invitation, the user interface component 120 can cause a first instance of the invitation to be presented via a user interface 128 presented on a first user computing device 104 associated with the first user, such as in a sent invitations element 130 of the first instance of connections interface 132 (illustrated connect 132. In some examples, the sent invitations element 130 can include a list of one or more pending invitations (e.g., sent but not yet accepted or declined) generated by the invitation management component 118 based on request(s) submitted by an associated user. In various examples, the first instance of the invitation can include data associated with the invitation, such as one or more recipients of the invitation, a first time associated with invitation delivery, a second time associated with invitation viewing (e.g., by the second user), a status of the invitation (e.g., pending, accepted, declined, etc.), and the like. In such examples, the user interface component 120 can access the data from the invitation management component 118 and/or the datastore 124 for presentation via the sent invitations element 130. In at least one example, the sent invitations element 130 of the connections interface 132 can enable the first user to monitor a status of one or more pending invitations generated on behalf of the first user and provided to other users. As used herein, the term element, such as a sent invitations element 130, can refer to a tab, section, or other portion of an interface associated with data corresponding to the particular element.

Additionally, in response to the invitation management component 118 sending the invitation, the user interface component 120 can cause a second instance of the invitation 134 associated with the invitation to be presented via a second instance of the connections interface 132 associated with the second user, such as in a received invitations element 136. As a non-limiting example, the connections interface 132 illustrated in FIG. 1 includes an interface associated with a recipient of a new invitation (e.g., the second user).

In various examples, the received invitations element 136 can include an interface element that provides a list of one or more pending invitations received by an associated user via the communication platform (e.g., via the invitation management component 118). In various examples, the second instance of the invitation 134 can include data associated with the invitation, such as a name (e.g., real name, user name, etc.) associated with a sending user of the invitation, a time associated with receipt of the invitation, a communication object type associated with the invitation, and the like. In some examples, the user interface component 120 can access the data from the invitation management component 118 and/or the datastore 124. As a non-limiting example, the second instance of the invitation 134 illustrated in FIG. 1 provides an indication that the invitation is associated with a channel, a name of the inviting user (e.g., the first user, User Z), an organization associated with the inviting user, and an email associated with the inviting user.

In some examples, in response to receiving a new invitation, the user interface component 120 can cause an alert 138 (e.g., notification, badge, etc.) to be presented in association with the received invitations element 136. The alert 138 can be configured to provide an indication that a new invitation has been received, such as to encourage the associated user to view and respond to the new invitation. In at least one example, the received invitations element 136 of the connections interface 132 can enable the second user to access the invitation received from the first user and/or one or more other invitations generated by the invitation management component 118.

In at least one example, the second instance of the invitation 134 can include selectable controls 140 to accept or decline the invitation. In various examples, in response to the invitation management component 118 receiving an indication of a declined invitation, the user interface component 120 can update the first instance of the connections interface 132 and/or the second instance of the connections interface 132 to reflect that the second user declined the invitation. For example, based on an indication of a declined invitation, the user interface component 120 can remove the second instance of the invitation 134 associated with the invitation from the received invitations element 136 of the second instance of the connections interface 132.

In some examples, in response to receiving an indication of acceptance of the invitation, the invitation management component 118 can send, to a user computing device 104 associated with the second user (e.g., via the second instance of the connections interface 132 or another interface), a request to input one or more characteristics to be associated with the communication object corresponding to the accepted invitation. In some examples, the request can be presented to the second user via a characteristics interface. The characteristic(s) can include a workspace, team, or group with which to associate the new communication object, a name or other identifier (e.g., image, GIF, etc.), privacy settings (e.g., public, private, etc.), shortcuts, files, and/or other details to associate with the communication object.

In various examples, in response to receiving the indication of acceptance of the invitation and/or the characteristic(s) associated with the communication object, the invitation management component 118 can generate the communication object (e.g., communication channel, direct messaging instance) associated with the invitation. In some examples, the communication object can be generated based in part on the characteristic(s). In at least one example, the user interface component 120 can update the first instance of the connections interface 132 and the second instance of the connections interface 132 to reflect the acceptance of the invitation and/or the newly generated communication object. For example, based in part on receiving the indication of acceptance of the invitation, the communication platform can remove the first instance of the invitation from the sent invitations element 130 of the first instance of the connections interface 132 and/or the second instance of the invitation 134 associated with the invitation from the received invitations element 136 of the second instance of the connections interface 132.

Additionally, as illustrated in FIG. 1, the user interface 128 can present data associated with one or more communication channels and, in some examples, one or more workspaces. In some examples, the user interface 128 can include a first region 144, or pane, that includes indicator(s)

(e.g., user interface element(s) or object(s)) associated with workspace(s) with which the user (e.g., account of the user) is associated. In some examples, the user interface 128 can include a second region 146, or pane, that includes indicator(s) (e.g., user interface element(s) or object(s)) representing data associated with the workspace(s) with which the user (e.g., account of the user) is associated. As will be discussed in further detail below with regard to FIGS. 2A and 2B, the data can include data associated with communication objects. In some examples, in response to receiving the indication of acceptance and generating the communication object based on the invitation, the user interface component 120 can cause an instance of the communication object to be presented in the second region 146. In some examples, the user interface component 120 can cause the instance of the communication object to be presented in the second region 146 responsive to receiving an indication of selection of an indicator corresponding to an associated workspace, such as via the first region 144. For example, a user may select a particular workspace for association with a new communication object generated responsive to the user accepting an invitation. Based on receiving an indication of selection of the particular workspace via the first region 144, the user interface component 120 can cause an instance of the new communication object to be presented in the second region 146.

Further, in some examples, in response to receiving an indication of selection of the instance of the new communication object, the user interface component 120 can be configured to cause data associated with the new communication object to be presented via a third region 148, or pane. In such examples, the third region 148 can be associated with a data feed (or, "message feed") indicating messages posted to and/or actions taken with respect to one or more communication channels, direct messaging instances, and/or other virtual spaces for facilitating communications (e.g., a virtual space associated with event(s) and/or action(s), etc.) as described herein. As illustrated in FIG. 1, data associated with the third region 148 can additionally or alternatively include data associated with a connections interface 132. Additional details associated with the user interface 128, and the third region 148, are described below with reference to FIGS. 2A and 2B.

In various examples, based in part on receiving the indication of acceptance of the invitation, the user interface component 120 can cause an instance of the communication object to be presented via a connection element 142 of respective instances of the connections interface 132. In some examples, the connection element 142 can provide a list of one or more communication objects generated based on requests submitted via the connections interface 132. In some examples, the connection element 142 can provide a list of one or more communication objects associated with a respective user that have been recently generated by the communication platform (e.g., based on request submitted via the interface and/or generated via another interface of the communication platform). In such examples, the communication object(s) associated with the list can include one or more communication objects that were generated within a threshold period of time (e.g., within the past day, week, month, etc.). In at least one example, the connection element 142 of the interface can enable an associated user to view information about and/or access (e.g., via a selectable control) communication objects associated with the associated user.

In some examples, the invitation management component 118 can be configured to additionally or alternatively provide the invitation to the second user via an alternative means of communication, such as via email, text message, networking message, or the like. In some examples, the alternative means of communication can include a third-party application, such as a third-party email application, third-party networking application, or the like. In such examples, the one or more applications 126 associated with the user computing device can include one or more third-party applications. In some examples, the invitation can include a link (e.g., hyperlink, URL, etc.) that is selectable to access the invitation. In such examples, the second user can select the link to access the invitation and submit a first input to accept or decline the invitation and, in some examples, a second input associated with characteristics of an associated communication object. Based on the received input, the user interface component 120 can update the first instance of the connections interface 132 and the second instance of the connections interface 132, as described above.

In at least one example, the datastore 124 can be configured to store data that is accessible, manageable, and updatable. In some examples, the datastore 124 can be integrated with the server(s) 102, as shown in FIG. 1. In other examples, the datastore 124 can be located remotely from the server(s) 102 and can be accessible to the server(s) 102 and/or user device(s), such as the user computing device 104. The datastore 124 can comprise multiple databases, which can include user/organizational data 162, as discussed above, and other data 164. Additional or alternative data can be stored in the data store and/or one or more other data stores.

In at least one example, the user/organizational data 162 can store data associated with users of the communication platform. In at least one example, the user/organizational data 162 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., jdoe, jdoe, etc.), a password, a time zone, a status, a token, and the like.

In at least one example, the user/organizational data 162 can store data in organizational profiles (which can also be referred to as "organization accounts"), which can store data associated with an organization, including, but not limited to, one or more organization identifiers, one or more communication channel identifiers associated with the organization, one or more group identifiers for groups (or, organizations, teams, entities, or the like) associated with the organization, an administrator identifier, organizational preferences, content transmitted via the communication platform in association with the organization (e.g., messages, emojis, conversations, documents, etc.), user identifiers associated with the organization, and the like.

In various examples, the other data 164 can include channel data associated with individual communication channels. The communication channels can allow the user computing devices to communicate and share data between and among each other. In at least one example, each communication channel can be assigned a communication channel identifier, which indicates the physical address in the channel data where data related to that communication channel is stored. A communication channel can be "public," which can allow any user within an organization (e.g., associated with an organization identifier) to join and participate in the data sharing through the communication channel, or a communication channel can be "private," which may restrict data communications in the communication channel to certain users or users having particular roles (e.g., managers, administrators, etc.). In some examples, a communication channel can be "shared," which can allow users associated with different organizations (e.g., entities associated with different organization identifiers) to join and participate in the data sharing through the communication channel. Shared channels can be public such that they are accessible to any user of either organization, or they can be private such that they are restricted to access by certain users or users having particular roles from both organizations.

In various examples, the other data 164 can include direct messaging instance data associated with direct messaging instances. The direct messaging instances can allow the user computing devices to communicate and share data between and among each other, such as in private conversations. A direct messaging instance can include two or more users. In at least one example, each direct messaging instance can be assigned a direct messaging instance identifier, which indicates the physical address in the channel data where data related to that communication channel is stored. In some examples, each direct messaging instance can include user identifiers associated with users associated therewith.

In some examples, the datastore 124 can be partitioned into discrete items of data that may be accessed and managed individually (e.g., data shards). Data shards may simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard can store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, individual groups can be associated with a database shard within the datastore 124 that stores data related to a particular group identification (e.g., workspace). For example, a database shard can store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a communication object can be associated with a database shard within the datastore 124 that stores data related to a particular communication object identification. For example, a database shard may store electronic communication data associated with the communication object, which enables members of that particular communication object to communicate and exchange data with other members of the same communication object in real time or near-real time. In this example, a group or organization may be the owner of the database shard and may control where and how the related data is stored.

In some examples, individual users can be associated with a database shard within the datastore 124 that stores data related to a particular user account. For example, a database shard can store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), HyperText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 152, computer-readable media 154, one or more communication interfaces 156, and input/output devices 158.

In at least one example, each processor of the processor(s) 152 can be a single processing unit or multiple processing units, and may include single or multiple computing units or multiple processing cores. The processor(s) 152 can comprise any of the types of processors described above with reference to the processor(s) 108 and may be the same as or different than the processor(s) 108.

The computer-readable media 154 can comprise any of the types of computer-readable media 154 described above with reference to the computer-readable media 110 and can be the same as or different than the computer-readable media 110. Functional components stored in the computer-readable media can optionally include the application(s) 126 described above and an operating system 160.

In at least one example, the application(s) 126 can include a mobile application, a web application, or a desktop application, which can be provided by the communication platform or which may be an otherwise dedicated application. In some examples, individual user computing devices associated with the system 100 can have an instance or versioned instance of the application(s) 126, which can be downloaded from an application store, accessible via the Internet, or otherwise executable by the processor(s) 152 to perform operations as described herein. That is, the application(s) 126 can be an access point, enabling the user computing device 104 to interact with the server(s) 102 to access and/or use communication services available via the communication platform. In at least one example, the application(s) 126 can facilitate the exchange of data between and among various other user computing devices, for example via the server(s) 102. In at least one example, the application(s) 126 can present user interfaces, as described herein. In at least one example, a user may interact with the user interfaces via touch input, keyboard input, mouse input, spoken input, or any other type of input, enabled by the I/O devices 158. Additional details associated with the user interfaces will be discussed with regard to FIGS. 2A and 2B.

In at least one example, the operating system 160 can manage the processor(s) 152, computer-readable media 154, hardware, software, etc. of the user computing device 104.

The communication interface(s) 156 can include one or more interfaces and hardware components for enabling communication with various other devices (e.g., the user computing device 104), such as over the network(s) 106 or directly. In some examples, the communication interface(s) 156 can facilitate communication via Websockets, APIs (e.g., using API calls), HTTPs, etc.

The user computing device 104 can further be equipped with various input/output devices 158 (e.g., I/O devices). Such I/O devices 158 can include a display, various user interface controls (e.g., buttons, joystick, keyboard, mouse, touch screen, etc.), audio speakers, connection ports and so forth.

While techniques described herein are described as being performed by the communication application 116, the invitation management component 118, the user interface component 120, and the application(s) 126, techniques described herein may be performed by any other component, or combination of components, which may be associated with the server(s) 102, the user computing device 104, or a combination thereof.

Figure 2A:
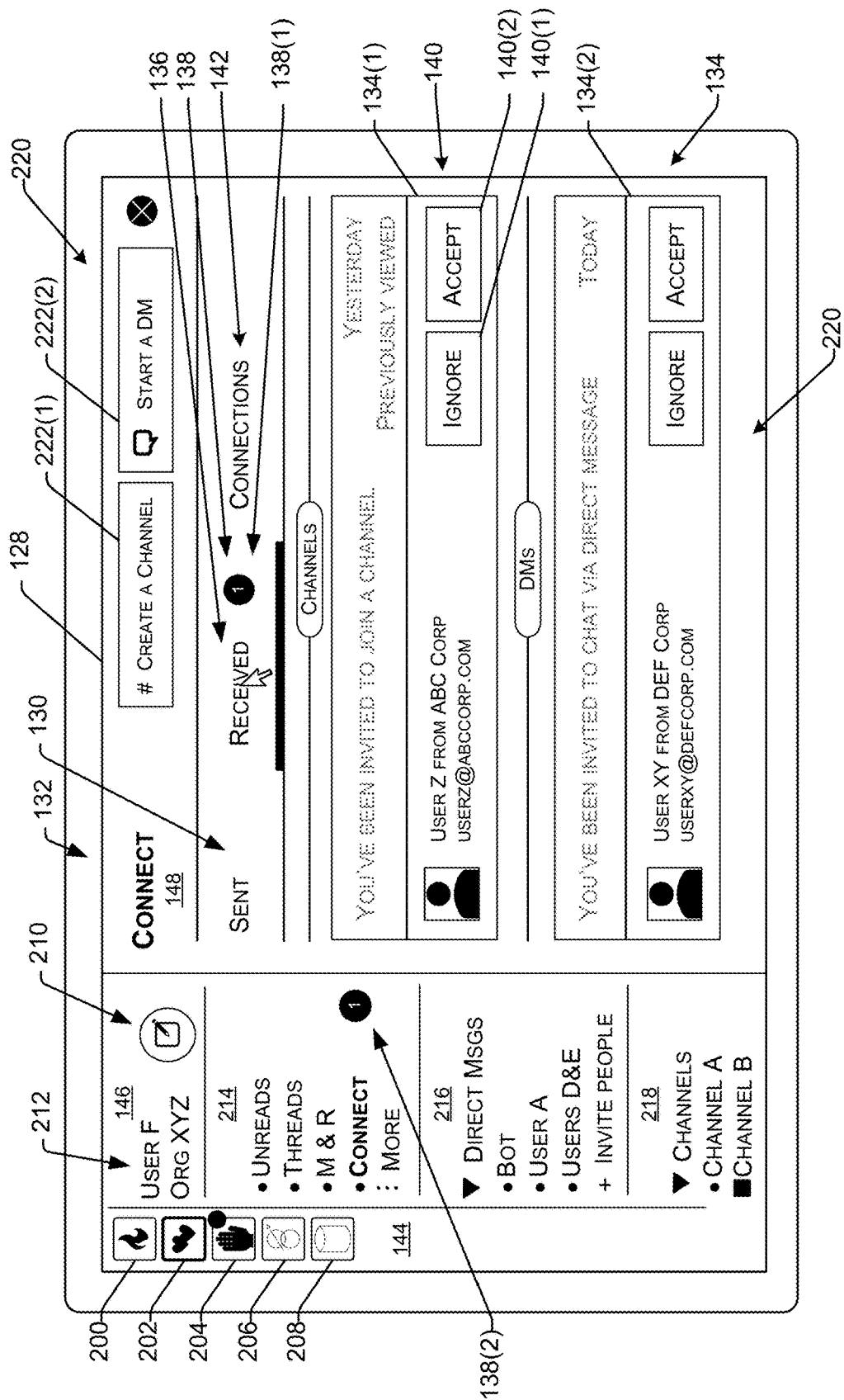
FIG. 2A is a schematic view of an example user interface associated with a communication platform through which a user can manage invitations to communicate via the communication platform, utilizing the techniques described herein.

FIG. 2A illustrates additional details associated with the user interface 128 that presents data associated with a connections interface 132, as described above with reference to FIG. 1.

As described above, in at least one example, the user interface 128 can include a first region 144, or pane, that includes indicator(s) (e.g., user interface element(s) or object(s)) of workspace(s) with which the user (e.g., account of the user) is associated. As illustrated in FIG. 2A, the user (e.g., User F) can be associated with five different workspaces. In some examples, the workspaces can be associated with a same organization (e.g., associated with a same organization identifier). In some examples, one or more of the workspaces can be associated with different organizations (e.g., associated with different organization identifiers). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 200-208, presented via the first region 144. In at least one example, a user account of the user (e.g., User F) can be associated with group identifiers that correspond to each of the workspaces (e.g., as determined by the communication platform user/org data 162). As such, the user account of the user can be associated with each of the workspaces. A first indicator 200 can represent a first workspace, a second indicator 202 can represent a second workspace, and a third indicator 204 can represent a third workspace, a fourth indicator 206 can represent a fourth workspace, and a fifth indicator 208 can represent a fifth workspace.

In some examples, the user can navigate between the workspaces by actuating a control associated with each of the indicators 200-208 without needing to log out of one workspace and log in to each of the other workspaces. Non-limiting examples of such indicators, or any indictors described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, the second indicator 202 is outlined in a heavier weight than the first indicator 200 and the third indicator 204, thereby indicating which workspace the user is currently interacting with and/or most recently interacted with. In some examples, the indicators 200-208 can be associated with another indicator indicating that the corresponding workspace has been updated. An example is shown with respect to the third indicator 204.

While five indicators 200-208 are illustrated in FIG. 2, the user can be associated with any number of workspaces. In some examples, indicators associated with all of the workspaces with which a user is associated can be presented via the first region 144. In some examples, some of the indicators associated with all of the workspaces with which a user is associated can be presented via the first region 144 and the user can interact with the user interface 128 to view additional or alternative indicators. In examples where fewer than all workspaces are represented via the user interface 128, the indicators can be arranged in alphabetical order, in an order of most recent interaction, in an order based on most frequent interaction, or some other order.

In some examples, the first region 144 may not be included in the user interface 128, and such information can be integrated into the user interface 128 via additional or alternative mechanisms.

In some examples, the user interface 128 can include a second region 146, or pane, that includes indicator(s) (e.g., user interface element(s) or object(s)) representing virtual space(s) associated with the workspace(s) with which the user (e.g., account of the user) is associated. In the illustrative example, the second region 146 can include a compose selectable control 210 that enables a user 212 (e.g., User F) to compose a message to another user. For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message can include any text, image, video, audio, or combination thereof provided by a user (using a user computing device). For instance, the user can provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers can comprise American Standard Code for Information Interchange (ASCII) text, a pointer, a memory address, or the like.

In at least one example, the second region 146 can include one or more sub-sections, or sub-panes, which can represent different virtual spaces. For example, a first sub-region 214 can include indicators representing virtual spaces that can aggregate data associated with a plurality of communication channels and/or workspaces. In at least one example, each virtual space can be associated with an indicator in the first sub-region 214. In some examples, an indicator can be associated with an actuation mechanism such that when actuated, can cause one of the one or more application(s) 126 (e.g., a communication platform application) to present data associated with the corresponding virtual space via the third region 148. In some examples, a virtual space can be associated with all unread data associated with each of the workspaces with which the user is associated. That is, in some examples, if the user requests to access the virtual space associated with "unreads," all data that has not been read (e.g., viewed) by the user can be presented in the third region 148, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action.

In some examples, each virtual space can be associated with a same type of event and/or action. For example, "threads" can be associated with messages, files, etc. posted in threads to messages posted in a communication channel and "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, communication channel, user, or the like.

In at least one example, a virtual space can be associated with facilitating communications between the user 212 and other users of the communication platform (illustrated as a select icon). For example, "connect" can be associated with enabling the user 212 to generate invitations to communicate with one or more other users. In at least one example, responsive to receiving an indication of selection of the "connect" indicator, the communication platform can cause a connections interface 132 to be presented in the third region 148.

In at least one example, the second region 146 of the user interface 128 can include a second sub-region 216, or sub-pane, that includes include indicators representative of communications with individual users or multiple specified users (e.g., instead of all, or a subset of, members of an organization). Such communications can be referred to as "direct messages." That is, the second sub-region 216, or sub-pane, can include indicators representative of virtual spaces that are associated with private messages between two or more users (e.g., direct messaging instances).

In addition to the second sub-region 216, the second region 146 can include a third sub-region 218, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user can be associated with both workspaces, or can only be associated with one of the workspaces. In some examples, the communication channels represented can be associated with combinations of communication channels associated with a single workspace and communication channels associated with different workspaces.

In some examples, the third sub-region 218 can depict all communication channels, or a subset of all communication channels, that the user has permission to access (e.g., as determined by the permission data stored in association with communication platform user/org data 162). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the third sub-region 218 can depict all communication channels, or a subset of all communication channels, that the user is a member of, and the user can interact with the user interface 128 to browse or view other communication channels that the user is not a member of but are not currently displayed in the third sub-region 218. In some examples, different types of communication channels (e.g., public, private, shared, cross-workspace, etc.) can be in different sections of the third sub-region 218, or can have their own sub-regions or sub-panes in the user interface 128. For example, shared channels can be presented in association with the "connect" indicator illustrated in the first sub-region 214, such as in a drop-down menu. In some examples, communication channels associated with different workspaces can be in different sections of the third sub-region 218, or can have their own regions or panes in the user interface 128.

In some examples, the indicators can be associated with graphical elements that visually differentiate types of communication channels. For example, Channel B is associated with a square visual element instead of a circle visual element. As a non-limiting example, and for the purpose of this discussion, the square visual element can indicate that the user is not a current member of Channel B, whereas the circle visual element can indicate that the user is a current member of Channel A. In some examples, additional or alternative graphical elements can be used to differentiate between public communication channels, private communication channels, shared communication channels, communication channels associated with different workspaces, and the like. In other examples, communication channels that the user is not a current member of may not be displayed in the third sub-region 218 of the user interface 128. In such examples, the user can navigate to a different interface (not shown) to browse additional channels that are accessible to the user but to which the user is not currently a member.

Figure 2B:
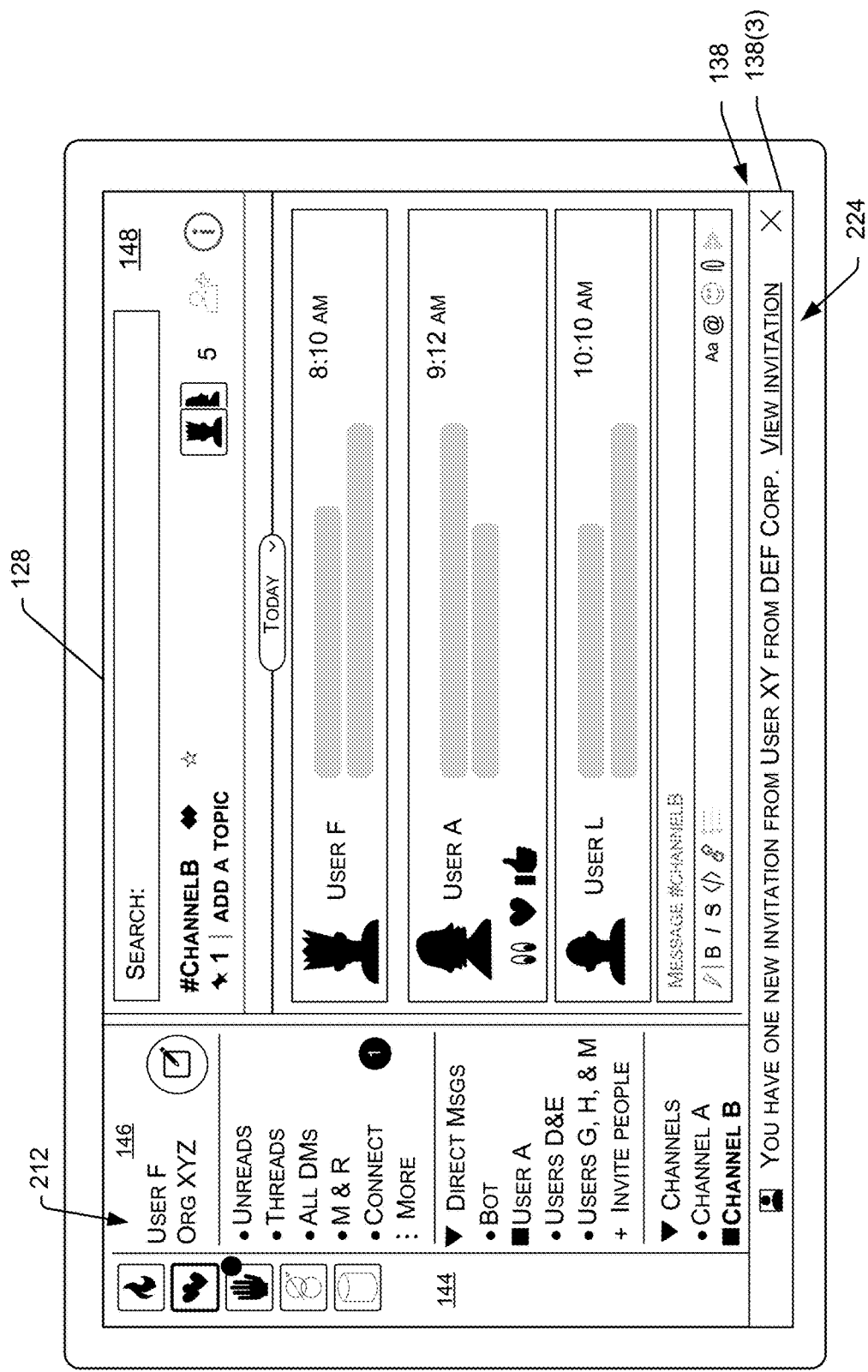
FIG. 2B is a schematic view of an example user interface associated with a communication platform in which a message feed associated with a communication object is presented with a notification associated with an invitation to communicate via another communication object, utilizing the techniques described herein.

As described above, in at least one example, the user interface 128 can include a third region 148, or pane, for presenting data associated with the communication platform, such as data associated with one or more communication channels, direct messaging instances, workspaces, and/or one or more external connections. As illustrated in FIG. 2B, the third region 148 can present data that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications.

As described above, in at least one example, data associated with the third region 148 can be associated with a connections interface 132. That is, in some examples, the third region 148 can present data associated with invitations to communicate via the communication platform and/or connections established based on the invitations. As a non-limiting example, the communications interface 132 can include a sent invitations element 130, a received invitations element 136, and a connection element 142. As described above, the sent invitations element 130 can include an interface element that provides an associated user with a list of one or more pending invitations (e.g., sent but not yet accepted or declined) generated by the communication platform based on request(s) submitted by the associated user. The received invitations element 136 can include an interface element that provides an associated user with a list of one or more pending invitations received by the associated user via the communication platform, such as list 220. The connection element 142 can include an interface element that provides the user 212 with an indication of one or more communication objects generated based on invitations (e.g., requests submitted via the interface). In some examples, the connection element 142 can include a list of communication object(s) associated with the user 212 that have been recently generated by the communication platform (e.g., based on request submitted via the interface and/or generated via another interface of the communication platform). In such examples, the communication object(s) can include indicator(s) associated with communication object(s) generated within a threshold period of time (e.g., within the past day, week, month, etc.) in the list. In at least one example, the connection element 142 can enable a user to view information about and/or access (e.g., via a selectable control) communication objects associated with the user. For example, the indicator(s) associated with the communication object(s) can include selectable controls to access a respective communication object.

In response to receiving a request to view the sent invitations element 130, the received invitations element 136, or the connection element 142 (e.g., receiving an indication of selection of a selectable control associated with a respective element), the communication channel can cause data associated with the requested element to be presented via the user interface 128. In the illustrative example, the data is presented via the connections interface 132 in the third region 148. However, this is not intended to be so limiting and the respective data can be presented in a window, in another interface, and/or in another region, such as in the second region 146.

In the illustrative example of FIG. 2A, the user 212 selects the received invitations element 136 (or invitations tab, invitations section, etc.) for view, such as to interact with the list 220 of pending invitation(s) received by the user 212. The list 220 shown in FIG. 2A includes an instance of a first invitation 134(1) and an instance of a second invitation 134(2), though this is merely for illustrative purposes and the list 220 may include a greater or lesser number of instances of invitations 134. For example, the list 220 may include no (e.g., zero) instances of invitations 134 received by the user 212. In such an example, the user 212 may not have received any invitations and/or may have accepted or declined the invitations previously received.

In various examples, the instances of the invitations 134 can include selectable controls 140, enabling the user 212 to accept or decline a respective invitation. For example, a first selectable control 140(1) can be associated with an ignore or decline option and a second selectable control 140(2) can be associated with an accept option. In some examples, and a described above, responsive to receiving an indication of selection of the first selectable control 140(1) or the second selectable control 140(2), the communication platform can cause a respective instance (illustrated as the instance of the first invitation 134(1)) to be removed from the received invitations element 136. That is, based on an input from the user 212 either accepting or declining the invitation, the communication platform can update the connections interface 132 to reflect the input.

In some examples, an instance of an invitation 134 can include an invitation for the user 212 to join an existing communication object, such as an existing communication object between the other user (e.g., User Z) and one or more additional users. In such examples, in response to receiving an indication of selection of the second selectable control 140(2), the communication platform can associate the user 212 with an existing communication object. In various examples, in response to associating the user 212 with the existing communication object, the communication platform can cause a first indicator associated therewith to be presented via the second region 146, such as in the second sub-region 216 (e.g., a new direct messaging instance) or the third sub-region 218 (e.g., a new communication channel). In some examples, in response to associating the user 212 with the existing communication object, the communication platform can cause a second indicator associated therewith to be presented via the connection element 142, such as in the list of connections (e.g., communication objects with which the user 212 is newly associated).

In various examples, in response to receiving an indication of selection of the second selectable control 140(2), the communication platform can generate a respective communication object. For example, responsive to receiving an indication of selection of the second selectable control 140(2) accepting the instance of the first invitation 134(1), the communication platform can generate a communication channel including at least the user 212 (e.g., User F) and at least one other user (e.g., User Z). For another example, responsive to receiving an indication of selection of the second selectable control 140(2) accepting the instance of the second invitation 134(2), the communication platform can generate a direct messaging instance between at least the user 212 and at least one other user (e.g., User XY). Though illustrated as invitations associated with a communication channel and a direct messaging instance, this is not intended to be so limiting and other communication objects are contemplated herein, such as a board, an event, an audio or video conversation, or the like.

As will be discussed in detail below with regard to FIGS. 3 and 4, in some examples, in response to receiving the indication of selection of the second selectable control 140(2) accepting the instance of an invitation 134, the communication platform can send a request to the user 212 to input one or more characteristics associated with the associated communication object. In some examples, the communication platform can cause an interface or interface element (e.g., a window, pop-up, etc.) to be presented in association with the connections interface 132. In such examples, the interface or interface element can enable the user 212 to input characteristic(s) to be associated with the new communication object. In at least one example, the characteristic(s) can include a workspace (e.g., team, group, etc.) with which the new communication object is to be associated with respect to a user account of the user 212. For example, the request for input and/or the interface or interface element can include a means for selecting one or more of the first workspace, the second workspace, the third workspace, the fourth workspace, or the fifth workspace, for association with the new communication object.

In various examples, the characteristic(s) can additionally or alternatively include a name or other identifier (e.g., image, GIF, etc.), privacy settings (e.g., public, private, etc.), shortcuts, files, and/or other details to associate with the new communication object. In some examples, the communication object can be generated based in part on the characteristic(s). In at least one example, the communication platform can request a workspace with which to associate a new direct messaging instance and can request a workspace, name, and privacy settings for association with a new communication channel.

In at least one example, based in part on the workspace associated with the new communication object, the communication platform can cause an indicator associated with the new communication object to be presented via the second region 146, such as when data associated with the respective indicator (indicators 200-208) is selected. In such an example, the indicator associated with the new communication object can be presented in the second sub-region 216 (e.g., a new direct messaging instance) or the third sub-region 218 (e.g., a new communication channel). In some examples, in response to generating the new communication object, the communication platform can cause a second indicator associated therewith to be presented via the connection element 142, such as in the list of connections (e.g., communication objects with which the user 212 is newly associated). In some examples, the second indicator can include a selectable control to enable the user 212 to access the new communication object from the connection element 142.

In addition to enabling the user 212 to manage existing invitations (e.g., sent invitations, pending invitations, connections made based in part on invitations, etc.) the connections interface 132 can, in some examples, include a communication object creation control 222. The communication object creation control 222 can enable the user 212 to generate a new invitation to communicate with another user via a communication object associated with the communication platform, such as described herein. In the illustrative example, the connections interface 132 can include a first communication object creation control 222(1) associated with inviting another user to communicate via a channel and a second communication object creation control 222(2) associated with inviting another user to communicate via a direct messaging instance. Though this is not intended to be so limiting and other communication objects are contemplated herein, as described above.

In some examples, the first communication object creation control 222(1) (illustrated as "create a channel") and in the second communication object creation control 222(2) (illustrated as "start a DM") can include controls that are associated with generating an invitation to communicate with another user via a new communication object. In some examples, responsive to receiving an indication of selection of a communication object creation control 222, the communication platform can request that the user 212 provide one or more user identifiers (e.g., name, username, handle, phone number, email, etc.) associated with one or more other users associated with the invitation (e.g., other user(s) with whom the user 212 desires to communicate via the new communication object). Based on the one or more user identifiers, the communication platform can identify the other user(s) and/or user account(s) associated therewith. In various examples, the communication platform can generate the invitation and provide the invitation to the other user(s) via other instance(s) of the connections interface 132 associated with respective user accounts of the other user(s).

In some examples, the communication object creation control 222 can additionally or alternatively be associated with inviting another user to communicate via an existing communication object. For example, in response to receiving an indication of selection of a first communication object creation control 222(1), the communication platform can request input from the user 212 indicating either an existing channel to associate the invitation with or a request to create a new channel. Based on receiving an input to associate the invitation with an existing communication object and one or more identifiers associated with one or more users receiving the invitation, the communication platform can generate the invitation and provide the invitation, with an indication of the existing communication object associated therewith.

In various examples, in response to providing a new invitation to a user, such as user 212, the communication platform can cause an alert 138 (e.g., notification, badge, etc.) to be presented via the user interface 128, alerting the user 212 that the new invitation has been received. The alert 138 can be configured to prompt the user 212 to access the connections interface 132 (e.g., received invitations element 136) to view and/or respond to the invitation. In the illustrative example, a first alert 138(1) is presented in association with an indicator corresponding to the connections interface 132, such as that illustrated in the first sub-region of the second region 146. In such an example, the first alert 138(1) can provide the user 212 with an indication of the received invitation while the user 212 is interacting with data associated with the communication platform. For example, the first alert 138(1) can be presented via the second region 146 (or another region of the user interface 128) concurrently with a messaging feed associated with a communication channel, direct messaging instance, or the like.

Additionally, in the illustrative example, a second alert 138(2) is presented in association with the received invitations element 136 of the connections interface 132. In such examples, the second alert 138(2) can be visible to the user 212 while the user 212 views and/or interacts with data associated with the connections interface 132. However, the examples of the first alert 138(1) and the second alert 138(2) are not intended to be so limiting and other examples of alerts 138 are contemplated herein. For example, as illustrated in FIG. 2B, a third alert 138(3) can include a notification that is presented concurrently with a messaging feed, such as that associated with a communication channel (e.g., Channel B).

In the illustrative example of FIG. 2B, the third alert 138(3) spans the first region 144, the second region 146, and the third region 148 of the user interface 128. However this is not intended to be so limiting and the third alert 138(3) can be presented in association with a single region, such as in the third region 148, in association with two regions, such as in the second region 146 and the third region 148, or the like.

In various examples, the third alert 138(3) can include an ephemeral notification configured to be presented for viewing by the user 212 for a period of time (e.g., 10 seconds, 20 seconds, etc.). In some examples, the third alert 138(3) can include a notification that is pinned to the user interface 128 until an input from the user 212 is received. For example, the third alert 138(3) can be pinned to the user interface 128 until the communication platform receives an input corresponding to the user 212 canceling the notification (e.g., selecting the X) or selecting a view invitation control 224. In various examples, in response to receiving an indication of selection of the view invitation control 224, the communication platform can cause the connections interface 132 to be presented via the user interface 128.

In some examples, in response to receiving the indication of selection of the view invitation control 224, the communication platform can cause another interface or interface element to be presented via the user interface 128 to enable the user 212 to view and/or interact with content associated with the invitation. For example, in response to an input of selection of the view invitation control 224, the communication platform can cause a window to be presented (e.g., pop up) in front of the messaging feed via the user interface 128. The window can include data associated with the invitation. In at least one example, the data can include a name or identifier associated with the inviter (e.g., inviting user), a type of communication object associated with the invitation, and selectable controls to enable the user 212 to accept or decline the invitation. In other examples, the window can include additional or alternative data associated with the invitation, such as that described herein.

FIGS. 3-9 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 3:
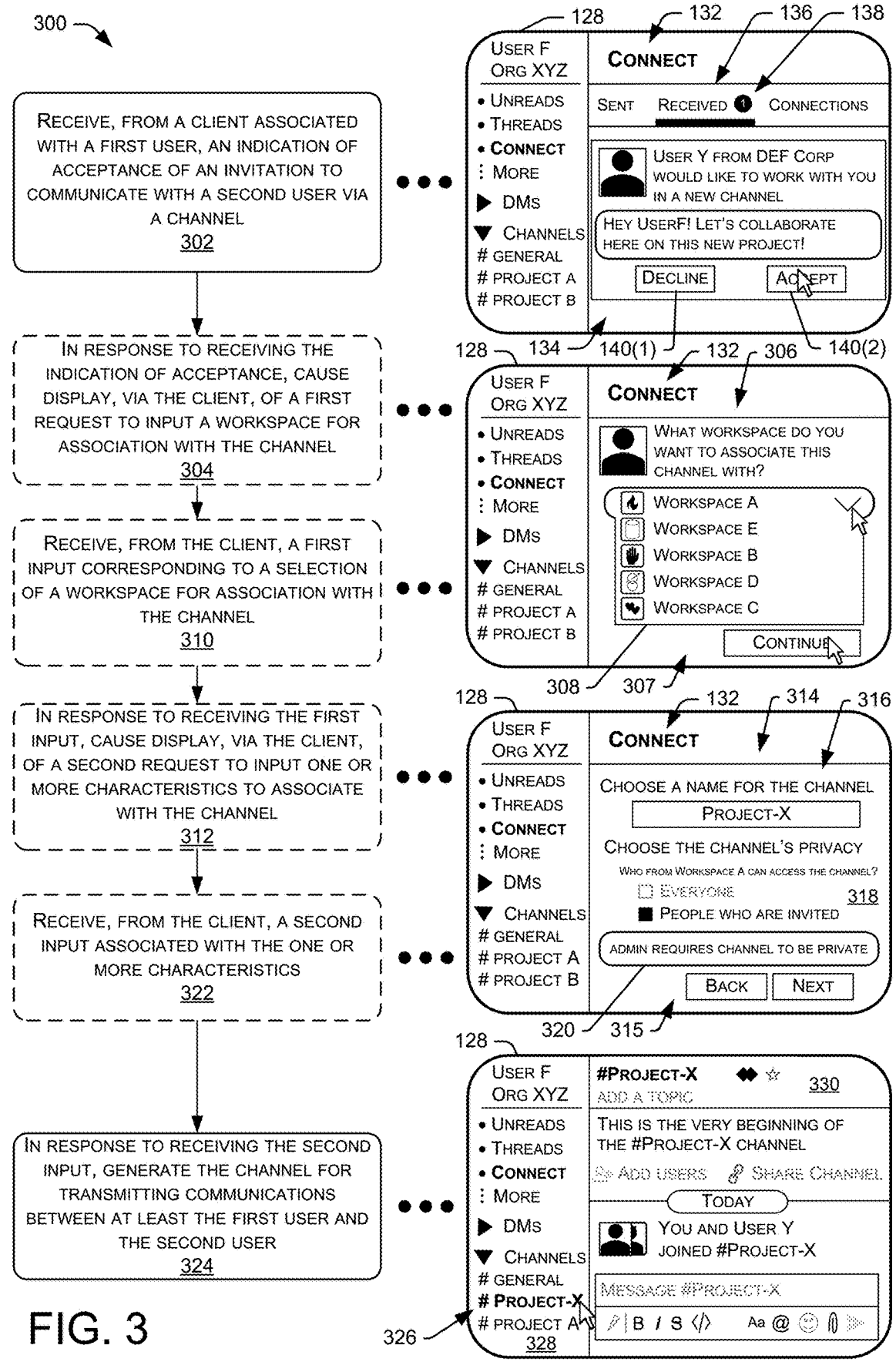
FIG. 3 illustrates an example process for generating a communication channel in response to receiving an indication of acceptance of an invitation to communicate via the communication channel, utilizing the techniques described herein.

FIG. 3 illustrates an example process for generating a communication channel in response to receiving an indication of acceptance of an invitation to communicate via the communication channel, utilizing the techniques described herein. In some examples, some or all of process 300 may be performed by one or more components in the system 100. By way of example and not limitation, the communication platform referred to in process 300 may be representative of a computing device associated with the (communication platform) server(s) 102, the first user computing device referred to in process 300 may be representative of the user computing device(s) 104. However, the process 300 is not limited to being performed by the system 100.

At operation 302, the communication platform can receive, from a client associated with a first user, an indication of acceptance of an invitation to communicate with a second user via a channel (e.g., communication channel). In some examples, the client can be associated with a user computing device, such as user computing device 104. The invitation to communicate can include an invitation generated, in response to a request from the second user, via an instance of a connections interface 132 associated with another client and/or user computing device. The communication platform can provide the invitation to the first user in response to the request, as described above.

In various examples, after the invitation is generated, the communication platform can cause an instance of the invitation 134 to be presented via a connections interface 132 associated with the client, such as in a received invitations element 136. In some examples, the communication platform can additionally cause an alert 138 to be presented via the connections interface 132. As discussed above, the alert 138 can include a notification, badge, or other icon indicating that a new invitation for the first user to communicate with another user has been received (e.g., associated with a user account of the first user).

As discussed above, the instance of the invitation 134 can include data associated with the invitation. The data can include a name (e.g., real name, username, etc.) associated with the second user of the invitation, user data associated with the second user (e.g., contact information, associated organization, associated workspace, etc.), a time associated with receipt of the invitation, a communication object type associated with the invitation, a personal message from the second user, and the like. For example, the illustrative example includes a name of the second user (e.g., User Y), an organization associated with the second user (e.g., DEF Corp.), a type of communication object (e.g., channel), and a personalized message addressed to the first user, though this is merely an example and other data for inclusion in the instance of the invitation 134 is contemplated herein.

In response to receiving an indication of selection of a first selectable control 140(1) to decline or ignore the invitation, the communication platform can update the connections interface 132, removing the instance of the invitation 134 from the received invitations element 136. In response to receiving an indication of selection of a second selectable control 140(2), the communication platform can determine the indication of acceptance of the invitation.

At operation 304, in response to receiving the indication of acceptance, the communication platform can optionally cause display (e.g., a presentation), via the client, of a first request 306 to input a workspace for association with the channel. In the illustrative example, the first request 306 is presented via the connections interface 132. In various examples, the first request 306 can be presented via a workspace selection interface 307 associated with the connections interface 132. In other examples, the first request 306 can be displayed or presented in association with another interface or interface element.

In various examples, the first request 306 can include an input box enabling the first user to input a name or other identifier associated with the workspace. In some examples, the first request 306 can include a list of workspaces 308. In such examples, an indicator associated with each workspace included in the list of workspaces 308 can include a selectable control enabling a selection of the associated workspace. In some examples, the list of workspaces 308 can include workspaces that are associated with the user account of the first user. In some examples, the list of workspaces 308 can include workspaces that are configured for association with the channel. In various examples, the workspaces that are configured for association with the channel can include those with privacy settings and/or permissions that enable the channel associated with the first user and the second user. For example, a private workspace may not be configured for association with the channel, whereas a public workspace may be appropriately configured. For another example, a shared workspace may be configured for association with the channel, whereas a single organization workspace may not be appropriately configured.

In some examples, the communication platform can be configured to present the list of workspaces 308 in a drop-down menu, a static menu, a scrollable list, and/or the like. In some examples, the list of workspaces 308 can be presented in a pre-determined order, such as in chronological order based on a time of creation, alphabetical order based on respective names, or the like. In various examples, the communication platform can be configured to rank the workspaces in the list of workspaces 308. In such examples, the list of workspaces 308 can include a ranked list (e.g., list of workspaces 308 presented in a ranked order). The communication platform can be configured to rank the workspaces based on one or more factors, such as a workspace associated with the invitation (e.g., workspace in which the second user was engaged when requesting the invitation), a recency of use of a workspace (e.g., how recently the first user and/or the second user viewed or interacted with content therein), frequency of use of a workspace (e.g., how frequently the first user and/or the second user viewed or interacted with content therein), frequency of communications between the first user and the second user in a workspace (e.g., private messages, mentions, etc.), an indication of a "favorite" workspace, or the like. In various examples, the list of workspaces 308 can enable the first user to select a workspace for association with the channel.

In various examples, based on receiving the indication of acceptance, the communication platform can access the user account associated with the first user and automatically determine a workspace with which to associate the channel. In some examples, the automatic determination of the workspace can be based on a determination that the user account has a single workspace associated therewith and/or a single workspace configured for association with the channel. In some examples, the communication platform can automatically associate the single channel with the single workspace. In other examples, based on a determination that the user account has a single workspace (or single appropriately configured workspace) associated therewith, the communication platform can cause the request 306 to be presented to the first user, the request 306 including a query as to whether the first user desires to create a new workspace for association with the channel.

In some examples, the communication platform can automatically determine the workspace for association with the channel based on a user preference associated with the first user and/or an organization preference associated with an organization of the first user, such as that stored in user/org data 162. For example, the first user and/or the organization of the first user can indicate, as a user preference and/or organization preference, a workspace to associate with channels and/or direct messaging instances associated with invitations. Based on the user and/or organization preference and the indication of acceptance, the communication platform can automatically associate the channel corresponding to the invitation.

At operation 310, the communication platform can optionally receive, from the client, a first input corresponding to a selection of a workspace for association with the channel. In some examples, the first input can include a workspace name or identifier input via the connections interface 132, such as in an input entry box. In some examples, the first input can include a selection of a workspace from the list of workspaces 308. In such examples, the first input can include an indication of the selection of the workspace.

At operation 312, in response to receiving the first input, the communication platform can optionally cause display, via the client, of a second request 314 to input one or more characteristics to associate with the channel. In the illustrative example, the second request 314 is presented via a characteristics interface 315 associated with the connections interface 132. In other examples, the second request 314 can be displayed or presented in association with another interface or interface element. As illustrated in FIG. 3, the characteristic(s) can include a name and a privacy setting to associate with the channel, though this is not intended to be so limiting and the characteristic(s) can additionally or alternatively include other characteristics, such as the workspace for association with the channel (e.g., communication object), shortcuts, files, and/or other details to associate with the new channel.

As shown in FIG. 3, the second request 314 can include a first characteristic input section 316 configured to enable the first user to input a first characteristic (e.g., name) to associate with the channel. In some examples, the first characteristic can include a characteristic that is specific to the user account of the first user. For example, a name input via the first characteristic input section 316 can be a display name associated with the channel that is presented to the first user via a user interface 128. In some examples, the first characteristic can include a characteristic that is stored in association with the channel, such as that which is viewable or accessible by all users associated with the channel (e.g., members of the channel).

In some examples, the second request 314 can include a second characteristic input section 318 configured to enable the second user to input a second characteristic (e.g., a privacy setting) to associate with the channel. In the illustrative example, the communication platform can enable functionality with respect to the second characteristic input section 318 based on administrative permissions and/or controls associated with an account of the first user and/or an account of the second user. In such an example, the communication platform can disable functionality with respect to a particular setting or characteristic based on the administrative permissions and/or controls. For example, an administrative permission and/or control associated with the user account of the first user and/or an organization associated therewith, may include a restriction on communication objects generated via the connections interface 132 to be private communication objects, including expressly invited users. As such, the communication platform may disable a functionality of a public access privacy setting (or privacy setting to enable "Everyone" access) on the second characteristic input section 318. Additionally, in some examples, the communication platform can be configured to automatically determine the privacy settings or other characteristic(s) to associate with the channel based on the permissions and/or controls. In some examples, the communication platform may present an explanatory note 320, including an explanation of why a particular functionality associated with the second characteristic input section 318 is disabled and/or an explanation of the automatically selected characteristic(s).

At operation 322, the communication platform can receive, from the client, a second input associated with the one or more characteristics. In response to receiving the second input, the communication platform can associate the second input with the first input, the channel, and/or the invitation. In various examples, the communication platform can store the first input and second input in association with the channel and/or the invitation, such as in datastore 124.

At operation 324, in response to receiving the second input, the communication platform can generate the channel for transmitting messages between at least the first user and the second user. The communication platform can store data associated with the channel in association with the at least the user account of the first user and a user account of the second user. The data can include data associated with the first input, the second input, the invitation, a channel identifier, messages and/or other data transmitted via the channel (e.g., files, attachments, links, emojis, reaction emojis, etc.), and/or the like.

In various examples, based on generating the channel, the communication platform can cause a channel indicator 326 associated therewith to be presented via the user interface 128, such as in a region 328, or pane, such as the second region 146 described above. Though this is not intended to be so limiting, and the channel indicator 326 can be presented in an additional or alternative region or pane of the user interface 128. In various examples, responsive to receiving an indication of selection of the channel indicator 326, the communication platform can cause data associated therewith to be presented in another region 330, or pane, such as the third region 148. In at least one example, the data presented can include a message feed associated with the newly generated channel and an interface element enabling the first user to input a message and post the message via the channel.

Figure 4:
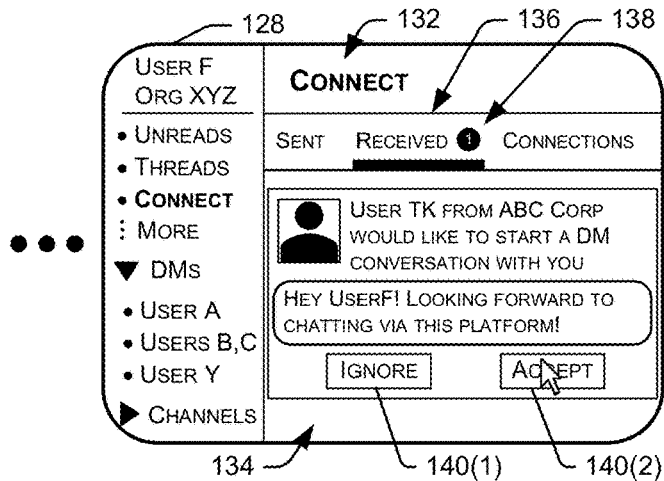
FIG. 4 illustrates an example process for generating a direct messaging instance in response to receiving an indication of acceptance of an invitation to communicate via the direct messaging instance, utilizing the techniques described herein.
Figure 4:
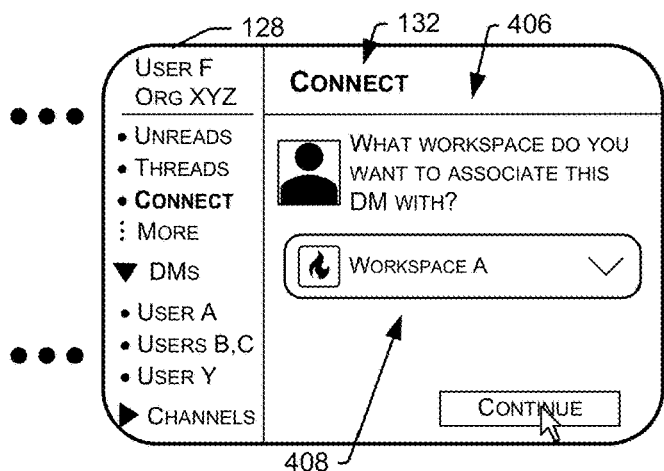
Figure 4:
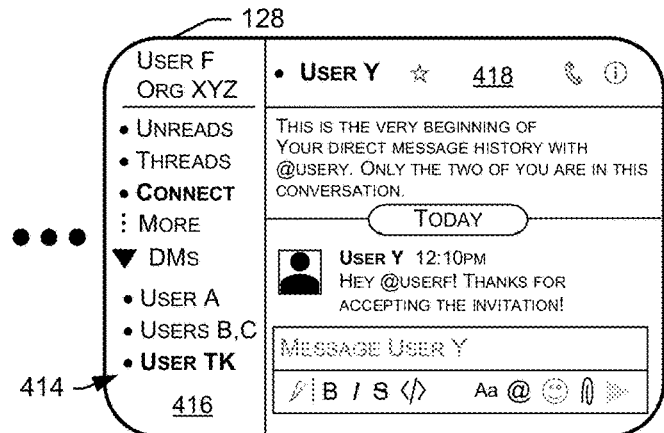

FIG. 4 illustrates an example process 400 for generating a direct messaging instance in response to receiving an indication of acceptance of an invitation to communicate via the direct messaging instance, utilizing the techniques described herein. In some examples, some or all of process 400 may be performed by one or more components in the system 100. By way of example and not limitation, the communication platform referred to in process 400 may be representative of a computing device associated with the (communication platform) server(s) 102, the first user computing device referred to in process 400 may be representative of the user computing device(s) 104. However, the process 400 is not limited to being performed by the system 100.

At operation 402, the communication platform can receive, from a client associated with a first user, an indication of acceptance of an invitation to communicate with a second user via a direct messaging instance (e.g., a DM). In some examples, the client can be associated with a user computing device, such as user computing device 104. The invitation to communicate can include an invitation generated, in response to a request from the second user, via an instance of a connections interface 132 associated with another client and/or user computing device. The communication platform can provide the invitation to the first user in response to the request, as described above.

In various examples, after the invitation is generated, the communication platform can cause an instance of the invitation 134 to be presented via the connections interface 132 associated with the client, such as in a received invitations element 136. In some examples, the communication platform can additionally cause an alert 138 to be presented via the connections interface 132. As discussed above, the alert 138 can include a notification, badge, or other icon indicating that a new invitation for the first user to communicate with another user has been received (e.g., associated with a user account of the first user).

As discussed above, the instance of the invitation 134 can include data associated with the invitation. The data can include a name (e.g., real name, username, etc.) associated with the second user of the invitation, user data associated with the second user (e.g., contact information, associated organization, associated workspace, etc.), a time associated with receipt of the invitation, a communication object type associated with the invitation, a personal message from the second user, and the like. For example, the illustrative example includes a name of the second user (e.g., User TK), an organization associated with the second user (e.g., ABC Corp.), a type of communication object (e.g., DM, channel, etc.), and a personalized message addressed to the first user, though this is merely an example and other data for inclusion in the instance of the invitation 134 is contemplated herein.

In response to receiving an indication of selection of a first selectable control 140(1) to decline or ignore the invitation, the communication platform can update the connections interface 132, removing the instance of the invitation 134 from the received invitations element 136. In response to receiving an indication of selection of a second selectable control 140(2), the communication platform can determine the indication of acceptance of the invitation.

At operation 404, in response to receiving the indication of acceptance, the communication platform can optionally cause display (e.g., a presentation), via the client, of a first request 406 to input a workspace for association with the DM. In the illustrative example, the first request 406 is presented via the connections interface 132. In other examples, the first request 406 can be displayed or presented in association with another interface or interface element.

In various examples, the first request 406 can include an input box enabling the first user to input a name or other identifier associated with the workspace. In some examples, the first request 406 can include a list of workspaces, such as list of workspaces 308. In such examples, an indicator associated with each workspace included in the list of workspaces can include a selectable control enabling a selection of the associated workspace. In some examples, the list of workspaces can include workspaces that are associated with the user account of the first user and are configured for association with the DM. In various examples, the workspaces that are configured for association with the DM can include those with privacy settings and/or permissions that enable the DM associated with the first user and the second user. For example, a shared workspace may be configured for association with the DM, whereas a single organization workspace may not be appropriately configured.

As discussed above with regard to FIG. 3, the list of workspaces can be presented in a drop-down menu, a static menu, a scrollable list, and/or the like. In some examples, the list of workspaces can be presented in a pre-determined order or a ranked order based on one or more factors, such as those described above. In the illustrative example, the communication platform causes a presentation of a first workspace "Workspace A" via a workspace input box 408, which is associated with a drop-down menu of workspaces. The first workspace presented via the workspace input box 408 can be a top-ranked workspace (e.g., most recently accessed, most frequently accessed, workspace associated with the invitation, etc.) and/or the first workspace can include a first workspace in a list of workspaces configured to be presented in a pre-determined order. The workspace input box 408 can enable the first user to input the selected workspace for association with the DM.

In various examples, the communication platform can be configured to automatically determine a workspace with which to associate the DM. In some examples, the communication platform can automatically determine the workspace based on a determination that a user account of the first user has a single workspace associated therewith. In such examples, the communication platform can identify the single workspace associated with the user account for association with the new DM instance. In some examples, the communication platform can determine the workspace based on one or more user or organization preferences associated with the user account, such as those stored in user/org data 162. For example, the user account can include a preference (user and/or organization) to associate new DM instances generated through the connections interface 132 with a particular workspace. Based on the preference, the communication platform can automatically identify the particular workspace for association with the DM instance At operation 410, the communication platform can optionally receive, from the client, a first input corresponding to a selection of a workspace for association with the channel. In some examples, the first input can include a workspace name or identifier input via the connections interface 132. In some examples, the first input can include a selection of a workspace from the list of workspaces. In such examples, the first input can include an indication of the selection of the workspace.

At operation 412, in response to receiving the first input, the communication platform can generate the DM for transmitting communications between at least the first user and the second user. The communication platform can store data associated with the DM in association with the at least the user account of the first user and a user account of the second user. The data can include data associated with the first input, the invitation, a DM instance identifier, messages and/or other data transmitted via the channel (e.g., files, attachments, links, emojis, reaction emojis, etc.), and/or the like.

In various examples, based on generating the DM, the communication platform can cause a DM indicator 414 associated therewith to be presented via the user interface 128, such as in a region 416, or pane, such as the second region 146 described above. Though this is not intended to be so limiting, and the DM indicator 414 can be presented in an additional or alternative region or pane of the user interface 128. In various examples, responsive to receiving an indication of selection of the DM indicator 414, the communication platform can cause data associated therewith to be presented in another region 418, or pane, such as the third region 148. In at least one example, the data presented can include a message feed associated with the newly generated DM and an interface element enabling the first user to input a message (or other communication) and post the message via the DM instance.

Figure 5:
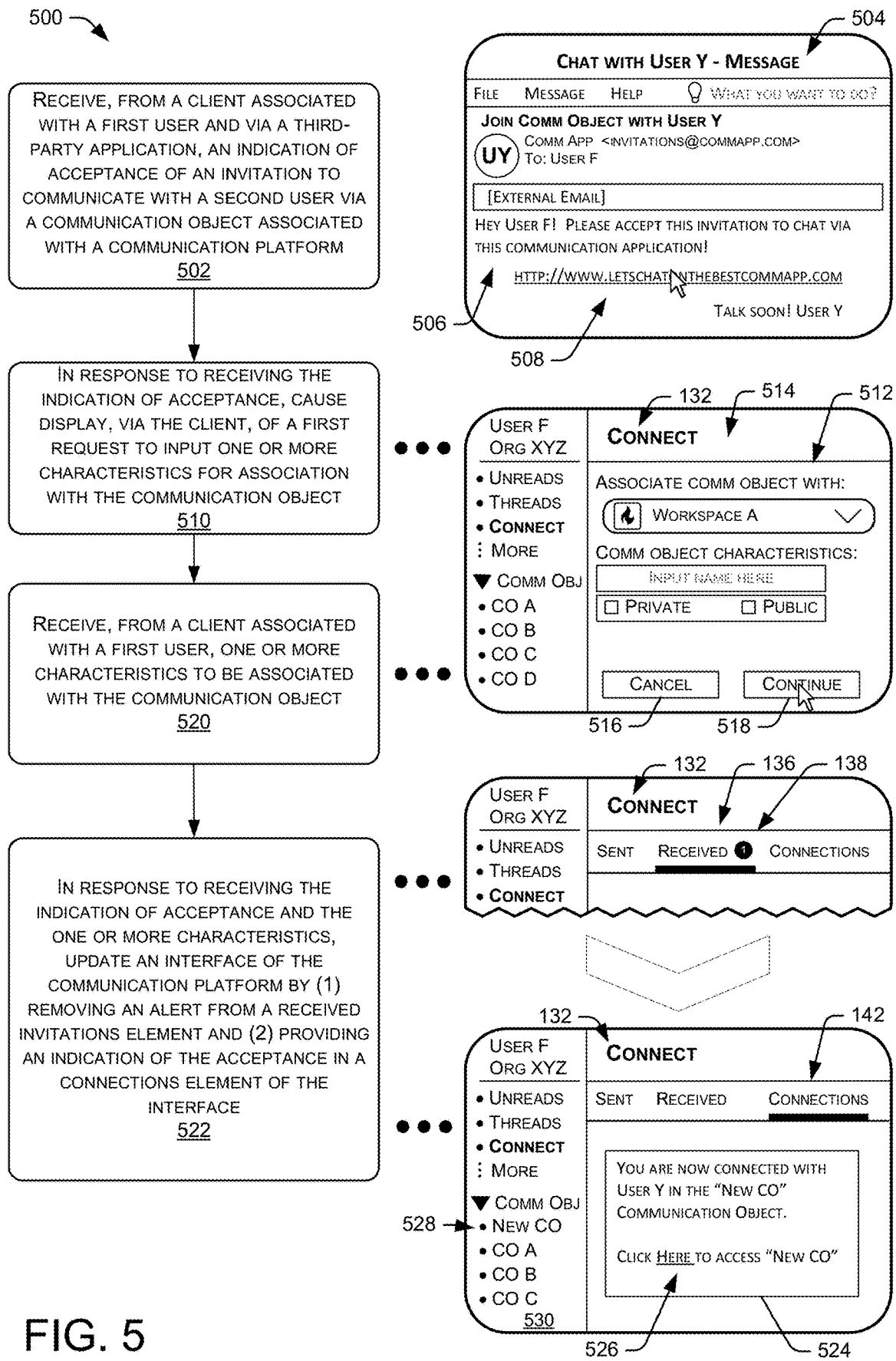
FIG. 5 illustrates an example process for updating a user interface to reflect an acceptance of an invitation to communicate via a communication object, utilizing the techniques described herein.

FIG. 5 illustrates an example process 500 for updating a user interface to reflect an acceptance of an invitation to communicate via a communication object, utilizing the techniques described herein. In some examples, some or all of process 500 may be performed by one or more components in the system 100. By way of example and not limitation, the communication platform referred to in process 500 may be representative of a computing device associated with the (communication platform) server(s) 102, the first user computing device referred to in process 500 may be representative of the user computing device(s) 104. However, the process 500 is not limited to being performed by the system 100.

At operation 502, the communication platform can receive, from a client associated with a first user and via a third-party application 504, an indication of acceptance of an invitation to communicate 506 with a second user via a communication object (e.g., channel, DM, board, audio and/or video conversation, etc.). In some examples, the client can be associated with a user computing device, such as user computing device 104. The invitation to communicate can include an invitation generated, in response to a request from the second user, via an instance of a connections interface 132 associated with another client and/or user computing device. In various examples, the request can include contact information associated with the first user, such as an email address, phone number, social networking handle or address, or the like. The communication platform can be configured to provide the invitation to the first user based on the contact information, in addition, or as an alternative to causing a presentation thereof via the connections interface 132 as shown above with regard to at least FIGS. 3 and 4.

In the illustrative example, the third-party application 504 includes an application associated with a third-party service provider configured to provide electronic mail services. However, this is not intended to be so limiting and other applications are contemplated herein, such as social networking messaging applications, short messaging service (SMS) applications, and/or any other communication applications that can enable a transmission of the invitation to communicate 506. In various examples, the invitation to communicate 506 can include selectable controls, such as the first selectable control 140(1) and the second selectable control 140(2), enabling the first user to decline or accept the invitation to communicate 506. In the illustrative example, the invitation to communicate 506 can include a link 508 (e.g., hyperlink, etc.) to access and/or accept the invitation. In some examples, the communication platform can determine the indication of acceptance of the invitation based on an indication that the first user selects the link 508.

At operation 510, in response to receiving the indication of acceptance (or indication of selection of the link 508), the communication platform causes display, via the client of a first request 512 to input one or more characteristics for association with the communication object. In the illustrative example, the first request 512 is presented via a characteristics interface 514 (e.g., characteristics page), such as characteristics interface 315, of the communications interface 132. In other examples, the first request 512 can be presented via an alternative interface associated with the communication platform (associated with the communication application 116). As illustrated in FIG. 5, the first request includes a request for a workspace for association with the communication object, a name and a privacy setting to associate with the communication object, though this is merely for illustrative purposes, and other characteristics are contemplated herein, such as an option to add (e.g., invite) additional users to the communication object, an option to add background art, colors, or the like, for association with the communication object (e.g., to personalize a look and feel of the communication object, make the communication object stand out from others, etc.), and the like.

In some examples, the characteristics interface 514 can include a cancel selectable control 516, enabling the first user to decline the invitation, such as if the first user changes their mind and determines to not proceed in the acceptance of the invitation to communicate with the second user. In some examples, the characteristics interface 514 can include a continue selectable control 518, enabling the first user to submit characteristic(s) input via the characteristics interface 514.

At operation 520, the communication platform receives, from the client, the characteristic(s) to be associated with the communication object. In various examples, the communication platform can receive the characteristic(s) based on receiving an indication of selection of the continue selectable control 518. In some examples, the communication platform can receive characteristics individually as they are input via the characteristics interface 514.

At operation 522, in response to receiving the indication of acceptance and the one or more characteristics, the communication platform updates an interface (e.g., the connections interface 132) of the communication platform by removing an alert 138 from a received invitations element 136 and providing an indication of the acceptance in a connection element 142 of the interface. In at least one example, the interface can include the connections interface 132.

The connection element 142 can include an interface element that presents one or more indicators 524 associated with communication object(s) generated based on invitations. In the illustrative example, a single indicator 524 is presented via the connection element 142, however, a greater or lesser number of indicators 524 can be presented. In some examples, the connection element 142 can include a list of communication object(s) associated with the first user that have been recently generated by the communication platform (e.g., based on request submitted via the interface and/or generated via another interface of the communication platform). In such examples, the indicator(s) 524 can be associated with communication object(s) generated within a threshold period of time (e.g., within the past day, week, month, etc.).

In at least one example, the indicator 524 can include a selectable control 526 to enable the first user to view information about and/or access (a respective communication object. Additionally, in some examples, the update to the connections interface 132 can include causing a presentation of a communication object indicator 528 to be presented in a region 530, or pane associated with the connections interface 132 (and associated with user interface 128). In various examples, responsive to selection of the selectable control 526 or the communication object indicator 528, the communication platform can cause data associated with the communication object to be presented to the first user, such as in a messaging feed as illustrated above in FIGS. 2B, 3, and 4.

Figure 6:
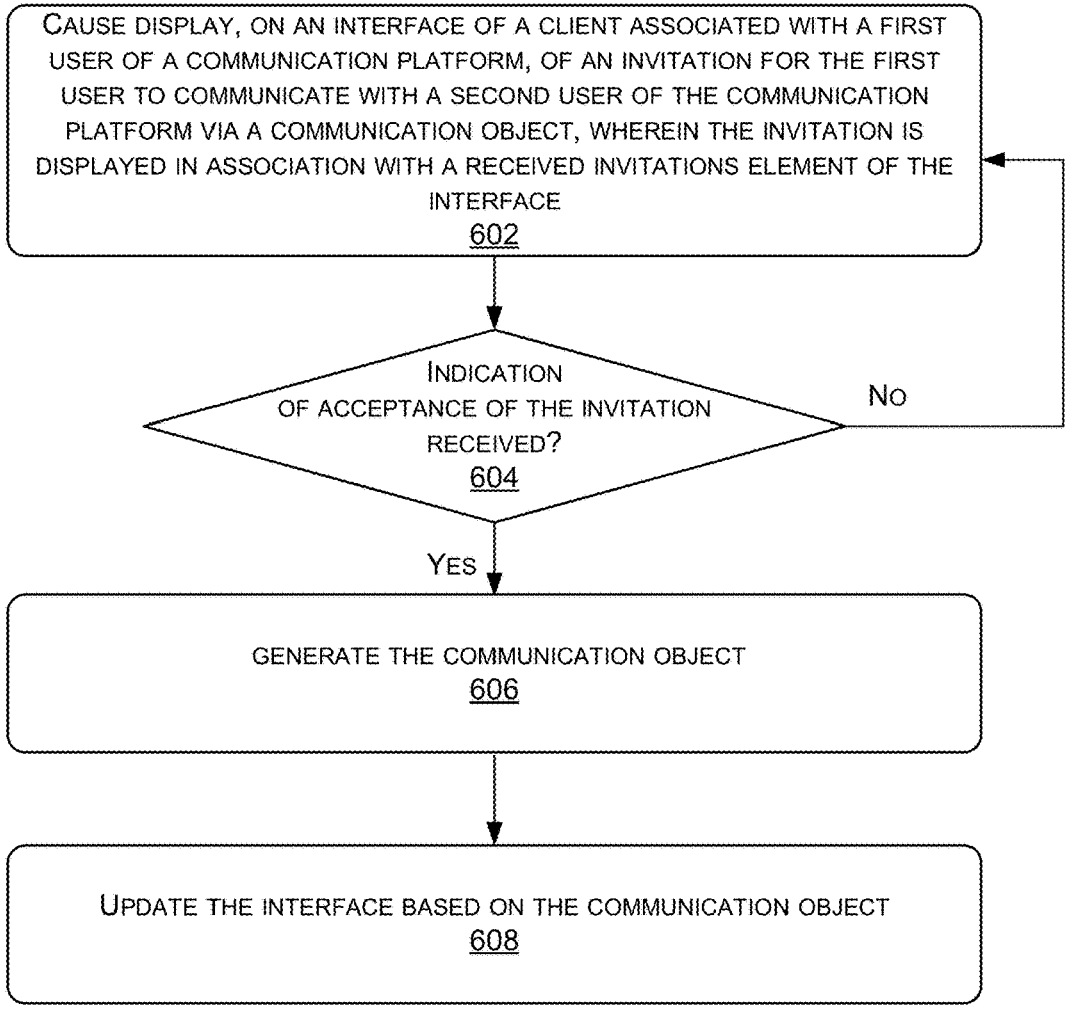
FIG. 6 illustrates an example process for providing an indication of an acceptance of an invitation to communicate via an interface of a communication platform, utilizing the techniques described herein.

FIG. 6 illustrates an example process 600 for providing an indication of an acceptance of an invitation to communicate via an interface of a communication platform, utilizing the techniques described herein. In some examples, some or all of process 600 may be performed by one or more components in the system 100. By way of example and not limitation, the communication platform referred to in process 600 may be representative of a computing device associated with the (communication platform) server(s) 102, the first user computing device referred to in process 600 may be representative of the user computing device(s) 104. However, the process 600 is not limited to being performed by the system 100.

At operation 602, the communication platform causes display, on an interface of a client associated with a first user of a communication platform, of an invitation for the first user to communicate with a second user of the communication platform via a communication object, wherein the invitation is displayed in association with a received invitations element of the interface. The interface can include a connections interface 132, as described herein. In various examples, the invitation can include an invitation to communicate via the communication object, such as that generated in response to receiving a request from the second user to invite the first user to communicate, as described herein.

At operation 604, the communication platform determines whether an indication of acceptance of the invitation is received. In various examples, the indication of acceptance of the invitation can be received via the interface, such as in response to receiving an input associated with an acceptance selectable control (e.g., second selectable control 140(2)). In various examples, the indication of acceptance of the invitation can be received from a third-party application or other interface associated with the client, such as that described with regard to FIG. 5. In such examples, the communication platform can send the invitation to the third-party application, for display via the third-party application associated with the client. In response to receiving an indication of selection of a link or other acceptance indicator associated with the invitation, the communication platform can determine that the indication of acceptance has been received.

Based on a determination that the indication of acceptance has not been received ("No" at operation 604), the communication platform can continue to cause display of the invitation, as described at operation 602. Based on a determination that the indication of acceptance has been received ("Yes" at operation 604), the communication platform, at operation 606, can generate the communication object. In some examples, the communication platform can generate the communication object based on characteristics provided by the first user and/or the second user.

In some examples, the second user can input one or more characteristics to associate with the communication object in association with a request to generate the invitation. In such examples, the communication platform can generate the communication object based on the indication of acceptance and based on the characteristic(s) provided by the second user. As discussed above, in some examples, in response to receiving an indication of acceptance, the communication platform can send a request for characteristics to the client (e.g., cause a presentation of the request via the interface). In some examples, the request can enable the first user to input one or more characteristics for association with the communication object. In such examples, the communication platform can generate the communication object based on the indication of acceptance and based on the characteristic(s) provided by the first user. Additionally or alternatively, the communication platform can generate the communication object, at least in part, based on stored characteristics to associate with the communication object, such as those stored in association with a user preference and/or organization preference associated with a user account of the first user and/or the second user. In at least one example, the communication platform can be configured to generate the communication object based on characteristic(s) provided by the first user, the second user, user preferences, and/or organization preferences.

At operation 608, the communication platform updates the interface based on the communication object. In some examples, the update to the interface includes causing display of a first indicator associated with the communication object to be presented in association with a connection element of the interface. In some examples, the communication platform can cause display of the first indicator in a first instance of the interface associated with the client and/or a second instance of the interface associated with another client of the second user. In some examples, the first indicator can include a selectable control configured to enable the first user (or the second user via the second client) to access data associated with the newly generated communication object.

In some examples, the update to the interface can include causing display of a second indicator associated with the communication object to be presented in association with a communication object list, such as that presented in a region (e.g., second region 146, region 328, region 416, etc.) associated with the interface. In some examples, the second indicator can include a selectable control configured to enable access to the newly generated communication channel. In some examples, the update to the interface can include a removal of an alert (e.g., alert 138), such as that presented in association with a received invitations element of the interface, in association with an indicator associated with the connections interface, or both.

Figure 7:
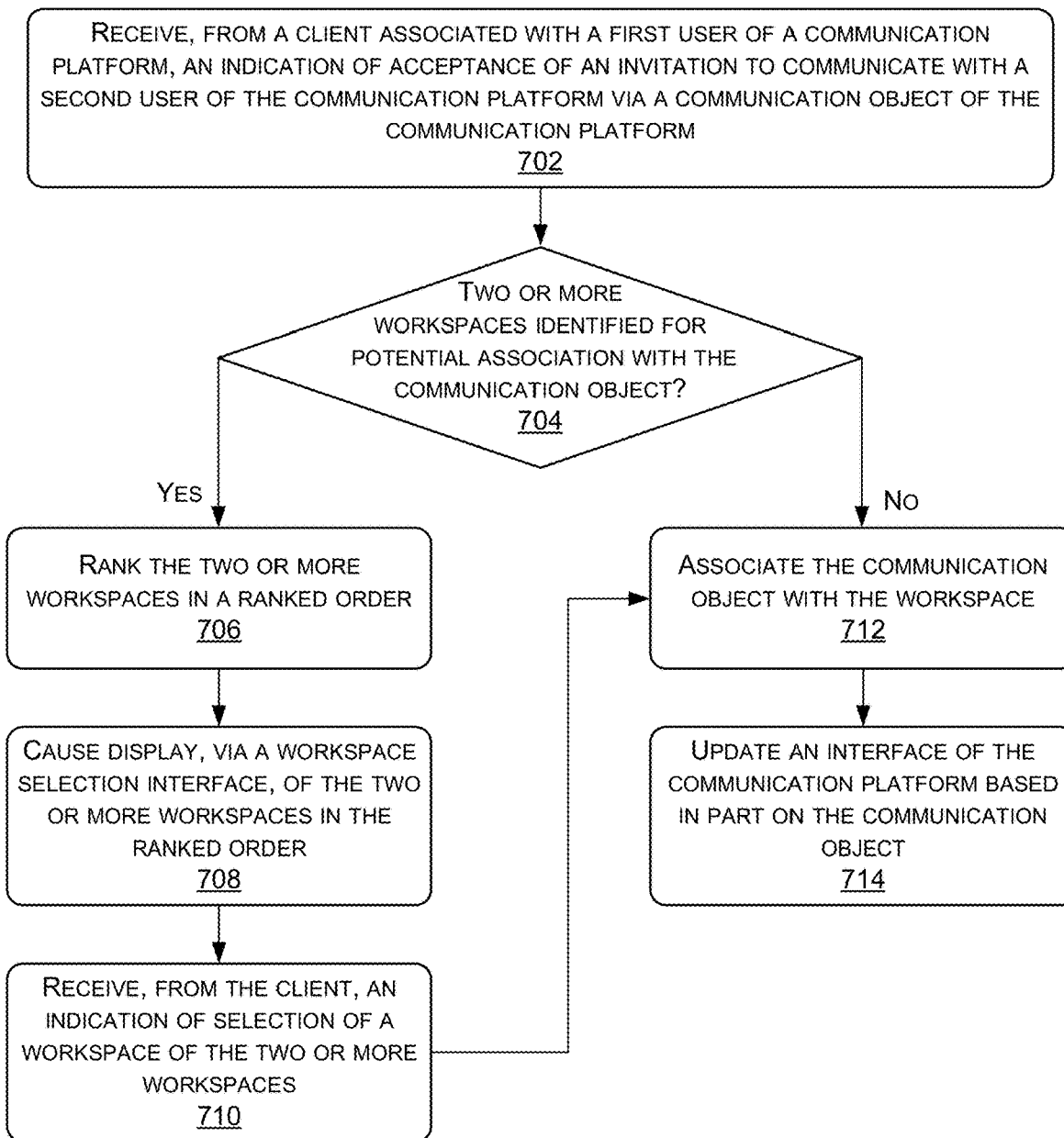
FIG. 7 illustrates an example process for enabling selection of a workspace for association with a communication object associated with an invitation to communicate via the communication platform, utilizing the techniques described herein.

FIG. 7 illustrates an example process 700 for enabling selection of a workspace for association with a communication object associated with an invitation to communicate via the communication platform, utilizing the techniques described herein. In some examples, some or all of process 700 may be performed by one or more components in the system 100. By way of example and not limitation, the communication platform referred to in process 700 may be representative of a computing device associated with the (communication platform) server(s) 102, the first user computing device referred to in process 700 may be representative of the user computing device(s) 104. However, the process 700 is not limited to being performed by the system 100.

At operation 702, the communication platform can receive, from a client associated with a first user, an indication of acceptance of an invitation to communicate with a second user of the communication platform via a communication object of the communication platform. In some examples, the client can be associated with a user computing device, such as user computing device 104. The invitation to communicate can include an invitation generated, in response to a request from the second user, via an instance of a connections interface (e.g., connections interface 132) associated with another client and/or user computing device. The communication platform can provide the invitation to the first user in response to the request, as described above.

In various examples, the indication of acceptance can be received via a connections interface associated with the client, such as in response to receiving an input associated with an acceptance selectable control (e.g., second selectable control 140(2)). In various examples, the indication of acceptance of the invitation can be received from a third-party application or other interface associated with the client, such as that described with regard to FIG. 5. In such examples, the communication platform can send the invitation to the third-party application, for display via the third-party application associated with the client. In response to receiving an indication of selection of a link or other acceptance indicator associated with the invitation, the communication platform can determine receipt of the indication of acceptance.

At operation 704, the communication platform determines whether two or more workspaces are identified for potential association with the communication object. In various examples, the communication platform identifies the workspace(s) that are associated with a user account of the first user. The communication platform determines whether two or more of the identified workspace(s) are configured for association with the communication object. A workspace may be configured for association with the communication object based on permissions associated therewith, characteristics of the second user (e.g., organization affiliation, account type, etc.), user preferences, organization preferences, and other factors. For example, the communication platform can determine that the second user is associated with an account type that is a limited functionality account. Based on the limited functionality account, the communication platform may determine that the communication object associated with the invitation received from the second user may be associated with a limited number of workspaces that are associated with the user account of the first user.

Based on a determination that the two or more workspaces are identified ("Yes" at operation 704), the communication platform, at operation 706, ranks the two or more workspaces in a ranked order. The ranked order can be based on one or more factors, such as a workspace associated with the invitation (e.g., workspace in which the second user was engaged when requesting the invitation), a recency of use of a workspace (e.g., how recently the first user and/or the second user viewed or interacted with content therein), frequency of use of a workspace (e.g., how frequently the first user and/or the second user viewed or interacted with content therein), frequency of communications between the first user and the second user in a workspace (e.g., private messages, mentions, etc.), an indication of a "favorite" workspace, or the like.

At operation 708, the communication platform causes display of the two or more workspaces in the ranked order. In some examples, the communication platform can present the two or more workspaces in a list of workspaces, such as list of workspaces 308. In some examples, the two or more workspaces can be presented in a drop-down menu, a static menu, a scrollable list, and/or any other type of display of the two or more workspaces.

Additionally, the communication platform can include an input box or other means by which the user may input a name or identifier associated with a workspace that is not one of the two or more workspaces. For example, a user account associated with the first user may have associated therewith a user preference to not associate communication objects generated based on invitations with a particular workspace. As such, the particular workspace may not be presented in the two or more workspaces displayed in the ranked order. The user may override the user preference, however, by inputting the name or other identifier associated with the particular workspace in the input box, thereby causing the particular workspace to be associated with the communication object.

At operation 710, the communication platform receives, from the client, an indication of selection of a workspace of the two or more workspaces. The indication of selection of the workspace can include a selection of a selectable control associated with the workspace of the two or more workspaces. In some examples, the indication of selection of the workspace can include an input, via the input box, of a name or identifier associated with the workspace for association with the communication object. In some examples, the workspace input via the input box can include a workspace that is currently associated with the first user or a new workspace to be generated and stored in association with the user account of the first user.

At operation 712, the communication platform associates the communication object with the workspace. In some examples, the communication platform can associate the communication object with the workspace based on a determination that a single workspace is identified for potential association with the communication object ("No" at operation 704). In such examples, the communication platform can determine that the user account of the first user has only one workspace associated therewith (e.g., one workspace configured for association with the communication object associated with the invitation), and automatically associates the communication object with the single workspace. In some examples, the communication object associates the communication object with the workspace based on the indication of selection of the workspace from the two or more workspaces, such as that described at operation 710.

At operation 714, the communication platform updates an interface of the communication platform based in part on the communication object. In some examples, the interface can include the connections interface 132, described above. In various examples, an update to the interface can include a presentation of a first indicator associated with the communication object in association with a connection element (e.g., connection element 142) of the interface. The first indicator can include data associated with the communication object, such as one or more other users associated therewith, a type of communication object, a time associated with communication object generation, an association of the communication object with the invitation, or the like. Additionally, the first indicator can include a selectable control to enable access the newly generated communication channel.

In some examples, the update to the interface can include a presentation of a second indicator associated with the communication object in association with a communication object list (e.g., list of channels, DMs, boards, etc.) presented via a region of the interface. In some examples, the second indicator can include a selectable control configured to enable access to the newly generated communication channel. In some examples, the update to the interface can include a removal of an alert (e.g., alert 138), such as that presented in association with a received invitations element of the interface, in association with an indicator associated with the connections interface, or both.

Figure 8:
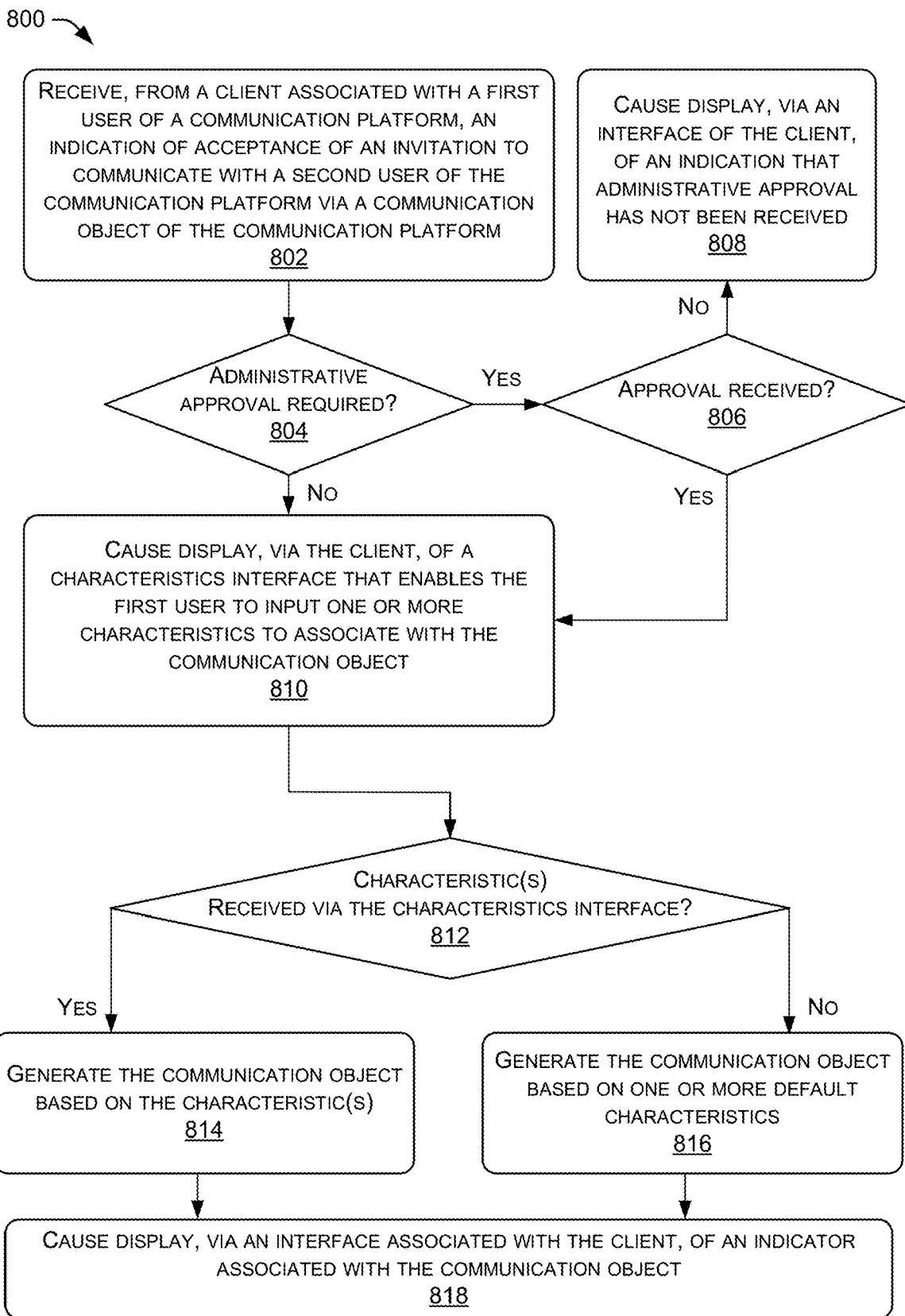
FIG. 8 illustrates an example process for generating a communication object based on one or more characteristics received in association with an indication of acceptance of an invitation to communicate via the communication object, utilizing the techniques described herein.

FIG. 8 illustrates an example process 800 for generating a communication object based on one or more characteristics received in association with an indication of acceptance of an invitation to communicate via the communication object, utilizing the techniques described herein. In some examples, some or all of process 800 may be performed by one or more components in the system 100. By way of example and not limitation, the communication platform referred to in process 800 may be representative of a computing device associated with the (communication platform) server(s) 102, the first user computing device referred to in process 800 may be representative of the user computing device(s) 104. However, the process 800 is not limited to being performed by the system 100.

At operation 802, the communication platform can receive, from a client associated with a first user, an indication of acceptance of an invitation to communicate with a second user of the communication platform via a communication object of the communication platform. In some examples, the client can be associated with a user computing device, such as user computing device 104. The invitation to communicate can include an invitation generated, in response to a request from the second user, via an instance of a connections interface (e.g., connections interface 132) associated with another client and/or user computing device. The communication platform can provide the invitation to the first user in response to the request, as described above.

In various examples, the indication of acceptance can be received via a connections interface associated with the client, such as in response to receiving an input associated with an acceptance selectable control (e.g., second selectable control 140(2)). In various examples, the indication of acceptance of the invitation can be received from a third-party application or other interface associated with the client, such as that described with regard to FIG. 5. In such examples, the communication platform can send the invitation to the third-party application, for display via the third-party application associated with the client. In response to receiving an indication of selection of a link or other acceptance indicator associated with the invitation, the communication platform can determine receipt of the indication of acceptance.

At operation 804, the communication platform determines whether administrative approval for the communication object is required. In some examples, the administrative approval can be based on user and/or organization preferences, such as that stored in user/org data 162. For example, an organization (e.g., administrator) associated with the first user can establish first organization preferences to require administrative approval for communication channels generated based on invitations and second organization preferences that do not require administrative approval for direct messaging instances generated based on invitations, or vice versa. For another example, an organization associated with the first user can establish organization preferences that require administrative approval for all communication objects generated based on invitations. For yet another example, an organization associated with the first user can establish an organization preference that administrative approval is not required for communication objects generated based on invitations.

Based on a determination that the administrative approval is required ("Yes" at operation 804), the communication platform, at operation 806, determines whether the administrative approval is received. The administrative approval may be received from a client associated with an administrative account of the organization of the first user. Based on a determination that the administrative approval is not received ("No" at operation 806), the communication platform causes display, via an interface of the client, of an indication that administrative approval has not been received. In some examples, the indication can include an indication that the administrative approval has been denied, such as in examples in which the administrator denies a request to approve generation of the communication object. In some examples, the indication can include an indication that the administrative approval is pending with the administrator. In such examples, the indication can provide the first user with an update of the pending request to approve generation of the communication object.

Based on a determination that either the administrative approval is not required ("No" at operation 804) or that the administrative approval is received ("Yes" at operation 806), the communication platform, at operation 810 causes display, via the client, of a characteristics interface that enables the first user to input one or more characteristics to associate with the communication object. As discussed above, the characteristics can include a workspace, group, or team with which to associate the new communication object, a name or other identifier (e.g., image, GIF, etc.), privacy settings (e.g., public, private, etc.), shortcuts, files, and/or other details to associate with the new communication object.

In some examples, the characteristics interface can include an interface associated with a request for input of one or more characteristics to be associated with the communication object, such as request 306, first request 406, and/or the like. In various examples, the characteristics interface can be associated with the connections interface (e.g., connections interface 132), such as a characteristics interface 514 thereof.

At operation 812, the communication platform determines whether the one or more characteristics are received via the characteristics interface. In various examples, the communication platform can determine that a characteristic is received based on an input submitted via the characteristics interface.

Based on a determination that the characteristic(s) are received ("Yes" at operation 812), the communication platform, at operation 814, generates the communication object based on the characteristic(s). Based on a determination that the characteristic(s) are not received ("No" at operation 812), the communication platform, at operation 816, generates the communication object based on one or more default characteristics. In some examples, the default characteristic(s) can include characteristic(s) that are established by the communication platform for association with newly generated communication objects, in absence of a characteristics input from the first user and/or the second user.

In some examples, the default characteristic(s) can include characteristic(s) that are input by the second user, such as in generating the invitation to communicate. In such examples, in absence of an overriding input from the first user, the communication platform can generate the communication object based on the characteristics input received from the second user. For example, the second user can submit a request to generate an invitation to communicate with the first user via a private channel. Based on a determination that the first user does not submit an input to modify the privacy settings, such as to make the channel public in order to invite another user, the communication platform can generate the communication object based on the default privacy setting provided by the second user.

In some examples, the default characteristic(s) can include characteristic(s) that are determined based on a user preference or organization preference associated with the first user and/or the second user. In such examples, the communication platform can access user preferences or organization preferences associated with user accounts of the first user and/or the second user to determine the default characteristic(s).

At operation 818, the communication platform causes display, via the interface associated with the client, of an indicator associated with the communication object. The indicator can include data associated with the communication object, such as a name or other identifier, a type of communication object, a time associated with generation of the communication object, names of users associated with the communication object, and/or the like. In various examples, the indicator can be presented in a communication object list, such as in a second region 146 or pane associated with the interface (e.g., sidebar pane). In some examples, the indicator can be presented via a connection element (e.g., connection element 142). In various examples, the indicator can include a selectable control to enable the first user to access and/or view data associated with the newly generated communication object.

Figure 9:
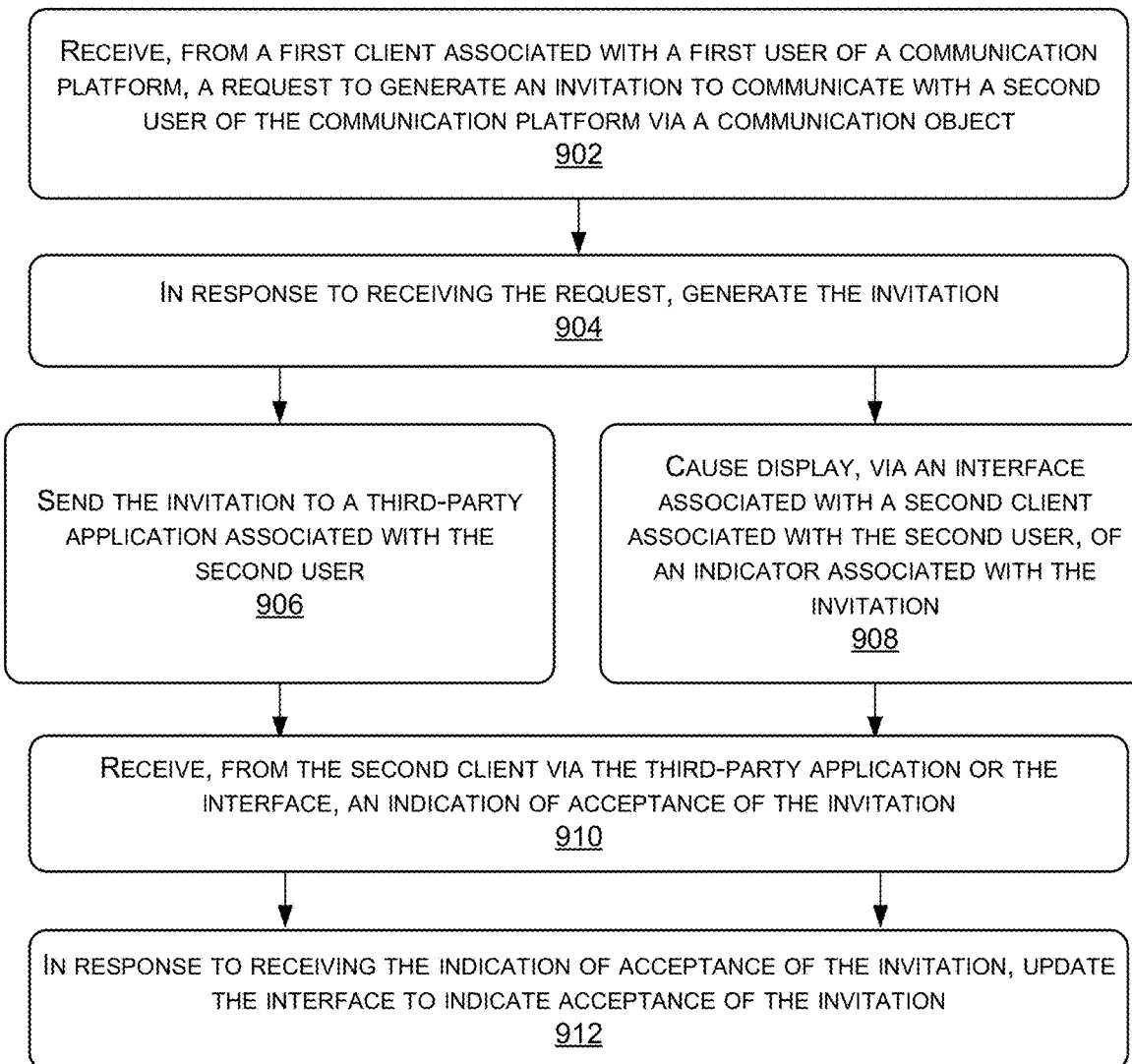
FIG. 9 illustrates an example process for updating a user interface to reflect an acceptance of an invitation to communicate via a communication object, utilizing the techniques described herein.

FIG. 9 illustrates an example process 900 for updating a user interface to reflect an acceptance of an invitation to communicate via a communication object, utilizing the techniques described herein. In some examples, some or all of process 900 may be performed by one or more components in the system 100. By way of example and not limitation, the communication platform referred to in process 900 may be representative of a computing device associated with the (communication platform) server(s) 102, the first user computing device referred to in process 900 may be representative of the user computing device(s) 104. However, the process 900 is not limited to being performed by the system 100.

At operation 902, the communication platform receives, from a first client associated with a first user of a communication platform, a request to generate an invitation to communicate with a second user of the communication platform via a communication object. In various examples, the request can include a user identifier (e.g., name, contact information, etc.) associated with the second user. In some examples, the communication platform can be configured to identify the second user based on the user identifier.

In various examples, the request can be submitted via a connections interface (e.g., connections interface 132) associated with the first client. In various examples, the request can be initiated by a selection of a communication object creation control 222, such as a first communication object creation control 222(1) associated with inviting another user to communicate via a channel, a second communication object creation control 222(2) associated with inviting another user to communicate via a direct messaging instance, or the like. In some examples, the request can include one or more user identifiers associated with one or more other users to be associated with the invitation (e.g., invitee(s)). While described primarily herein as a first user inviting a second user, this is not intended to be so limiting, and examples are contemplated herein that include generating an invitation for the first user to communicate with two or more other users via the communication object.

At operation 904, in response to receiving the request, the communication platform generates the invitation and, at operation 906, the communication platform sends the invitation to a third-party application associated with the second user. In various examples, the communication platform sends the invitation to the third-party application based on the user identifier associated with the second user corresponding to the request. In some examples, the communication platform identifies the second user based on the user identifier associated with the second user and identifies a third-party user account associated with the second user based on the identification. In such examples, the communication platform sends the invitation to the second user via the third-party user account. For example, the request can include a username of the second user. The communication platform can identify an email address associated with the second user based on the username, the email address being associated with a third-party electronic mail service provider and a corresponding third-party application. The communication platform can send the invitation via email to the second user.

At operation 908, the communication platform can additionally cause display, via an interface associated with the second client, of an indicator associated with the invitation. In some examples, the interface can include the connections interface 132, described above. In some examples, the indicator can be presented via a received invitations element 136 of the interface. The indicator can include an instance of the invitation, such as that described above as including data associated with the invitation. In some examples, the communication platform can additionally cause an alert to be presented in association with the interface, to provide an indication to the second user that a new invitation has been received. The alert can be presented in association with the received invitations element 136 or other similar element of the interface, and/or in association with a sidebar of the interface, such as that providing selectable controls to access one or more communication objects, or interfaces associated with the communication object(s), as described above.

At operation 910, the communication platform receives, from the second client via the third-party application or the interface, an indication of acceptance of the invitation. In various examples, the indication of acceptance can include an indication of selection of a selectable control, such as the second selectable control 140(2), enabling the first user accept the invitation to communicate. In some examples, the indication of acceptance can include an indication of selection of a link (e.g., hyperlink, etc.) associated with the invitation and configured to enable the second user to access and/or accept the invitation.

At operation 912, in response to receiving the indication of acceptance, the communication platform updates the interface to indicate acceptance of the invitation. In various examples, an update to the interface can include a presentation of a first indicator associated with the communication object in association with a connection element (e.g., connection element 142) of the interface. The first indicator can include data associated with the communication object, such as one or more other users associated therewith, a type of communication object, a time associated with communication object generation, an association of the communication object with the invitation, or the like. Additionally, the first indicator can include a selectable control to enable access the newly generated communication channel.

In some examples, the update to the interface can include a presentation of a second indicator associated with the communication object in association with a communication object list (e.g., list of channels, DMs, boards, etc.) presented via a region of the interface. In some examples, the second indicator can include a selectable control configured to enable access to the newly generated communication channel. In some examples, the update to the interface can include a removal of an alert (e.g., alert 138), such as that presented in association with a received invitations element of the interface, in association with an indicator associated with the connections interface, or both.

Example Clauses

A: A system comprising: one or more processors; and one or more computer readable media storing instructions that, when executed, cause the system to perform operations comprising: causing display, on an interface of a client associated with a first user of a communication platform, of an invitation for the first user to communicate with a second user of the communication platform via a communication object, wherein the invitation is displayed in association with a received invitations section of the interface; receiving, from the client associated with the first user, an indication of acceptance of the invitation; based at least in part on the indication of acceptance, generating the communication object; and updating the interface to indicate acceptance of the invitation, wherein updating the interface comprises removing the invitation from display in association with the received invitations section of the interface.

B: The system of paragraph A, the operations further comprising: based at least in part on receiving the indication of acceptance of the invitation, causing display, via the client associated with the first user, of one or more workspaces configured for association with the communication object; receiving, from the client, an indication of selection of a workspace of the one or more workspaces for association with the communication object; and associating the communication object with the workspace.

C: The system of paragraph B, the operations further comprising: identifying the one or more workspaces associated with a first user account of the first user that are configured for association with the communication object; and ranking the one or more workspaces in a ranked order based at least in part on characteristics associated with individual workspaces of the one or more workspaces, wherein the one or more workspaces are displayed in the ranked order.

D: The system of any one of paragraphs A-C, the operations further comprising: based at least in part on receiving the indication of acceptance of the invitation, causing display of a request for the first user to input one or more characteristics to be associated with the communication object; and receiving, from the client, the one or more characteristics to be associated with the communication object, wherein generating the communication object comprises generating the communication object based at least in part on the one or more characteristics.

E: The system of any one of paragraphs A-D, the operations further comprising sending the invitation to a third-party application associated with the first user, wherein the indication of acceptance is received via the third-party application.

F: The system of any one of paragraphs A-E, wherein updating the interface further comprises at least one of: causing display of an indicator associated with the communication object to be presented in association with a communication object list associated with the interface; or causing display of the indicator in association with a connections interface section of the interface.

G: The system of any one of paragraphs A-F, wherein the communication object comprises at least one of: a communication channel; or a direct messaging instance.

H: A method comprising: causing display, on an interface of a client associated with a first user of a communication platform, of an invitation for the first user to communicate with a second user of the communication platform via a communication object, wherein the invitation is displayed in association with a received invitations section of the interface; receiving, from the client associated with the first user, an indication of acceptance of the invitation; based at least in part on the indication of acceptance, generating the communication object; and updating the interface to indicate acceptance of the invitation, wherein updating the interface comprises removing the invitation from display in association with the received invitations section of the interface.

I: The method of paragraph H, further comprising: based at least in part on receiving the indication of acceptance of the invitation, causing display, via the client associated with the first user, of one or more workspaces configured for association with the communication object; receiving, from the client, an indication of selection of a workspace of the one or more workspaces for association with the communication object; and associating the communication object with the workspace.

J: The method of paragraph I, further comprising: identifying the one or more workspaces associated with a first user account of the first user that are configured for association with the communication object; and ranking the one or more workspaces in a ranked order based at least in part on characteristics associated with individual workspaces of the one or more workspaces, wherein the one or more workspaces are displayed in the ranked order.

K: The method of any one of paragraphs H-J, further comprising: based at least in part on receiving the indication of acceptance of the invitation, causing display of a request for the first user to input one or more characteristics to be associated with the communication object; and receiving, from the client, the one or more characteristics to be associated with the communication object, wherein generating the communication object comprises generating the communication object based at least in part on the one or more characteristics.

L: The method of any one of paragraphs H-K, further comprising sending the invitation to a third-party application associated with the first user, wherein the indication of acceptance is received via the third-party application.

M: The method of any one of paragraphs H-L, wherein updating the interface further comprises at least one of: causing display of an indicator associated with the communication object to be presented in association with a communication object list associated with the interface; or causing display of the indicator in association with a connections interface section of the interface.

N: The method of any one of paragraphs H-M, wherein the communication object comprises at least one of: a communication channel; or a direct messaging instance.

O: One or more non-transitory computer readable media storing instructions that, when executed, cause one or more processors to perform operations comprising: causing display, on an interface of a client associated with a first user of a communication platform, of an invitation for the first user to communicate with a second user of the communication platform via a communication object, wherein the invitation is displayed in association with a received invitations section of the interface; receiving, from the client associated with the first user, an indication of acceptance of the invitation; based at least in part on the indication of acceptance, generating the communication object; and updating the interface to indicate acceptance of the invitation, wherein updating the interface comprises removing the invitation from display in association with the received invitations section of the interface.

P: The one or more non-transitory computer readable media of paragraph O, the operations further comprising: based at least in part on receiving the indication of acceptance of the invitation, causing display, via the client associated with the first user, of one or more workspaces configured for association with the communication object; receiving, from the client, an indication of selection of a workspace of the one or more workspaces for association with the communication object; and associating the communication object with the workspace.

Q: The one or more non-transitory computer readable media of paragraph P, the operations further comprising: identifying the one or more workspaces associated with a first user account of the first user that are configured for association with the communication object; and ranking the one or more workspaces in a ranked order based at least in part on characteristics associated with individual workspaces of the one or more workspaces, wherein the one or more workspaces are displayed in the ranked order.

R: The one or more non-transitory computer readable media of any one of paragraphs O-Q, the operations further comprising: based at least in part on receiving the indication of acceptance of the invitation, causing display of a request for the first user to input one or more characteristics to be associated with the communication object; and receiving, from the client, the one or more characteristics to be associated with the communication object, wherein generating the communication object comprises generating the communication object based at least in part on the one or more characteristics.

S: The one or more non-transitory computer readable media of any one of paragraphs O-R, the operations further comprising sending the invitation to a third-party application associated with the first user, wherein the indication of acceptance is received via the third-party application.

T: The one or more non-transitory computer readable media of any one of paragraphs O-S, wherein updating the interface further comprises at least one of: causing display of an indicator associated with the communication object to be presented in association with a communication object list associated with the interface; or causing display of the indicator in association with a connections interface section of the interface.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer readable media storing instructions that, when executed, cause the system to perform operations comprising:
causing display, on an interface of a client associated with a first user of a communication platform, of an invitation for the first user to communicate with a second user of the communication platform via a communication channel in which a subset of users of the communication platform are authorized to access, wherein the invitation is displayed in association with a received invitations section of the interface;
receiving, from the client associated with the first user, an indication of acceptance of the invitation;
in response to receiving the indication of acceptance and prior to generation of the communication channel, generating a user interface for receiving characteristics associated with the communication channel;

receiving, via the user interface and from at least one of the first user or the second user, the characteristics, wherein the characteristics include a type of the communication channel, an identifier of the communication channel, and one or more privacy settings associated with the communication channel;

based at least in part on the indication of acceptance, generating the communication channel using the characteristics; and updating the interface to indicate acceptance of the invitation, wherein updating the interface comprises removing the invitation from display in association with the received invitations section of the interface and causing an instance of the communication channel to be displayed within an additional section of the interface that is different than the received invitations section of the interface, wherein the communication channel is accessible by the first user via the instance and wherein the additional section of the interface includes instances of other communication channels associated with the first user.

2. The system of claim 1, the operations further comprising:

based at least in part on receiving the indication of acceptance of the invitation, causing display, via the client associated with the first user, of one or more workspaces configured for association with the communication channel;

receiving, from the client, an indication of selection of a workspace of the one or more workspaces for association with the communication channel; and associating the communication channel with the workspace.

3. The system of claim 2, the operations further comprising:

identifying the one or more workspaces associated with a first user account of the first user that are configured for association with the communication channel; and ranking the one or more workspaces in a ranked order based at least in part on second characteristics associated with individual workspaces of the one or more workspaces, wherein the one or more workspaces are displayed in the ranked order.

4. The system of claim 1, the operations further comprising:

based at least in part on receiving the indication of acceptance of the invitation, causing display of a request for the first user to input the characteristics to be associated with the communication channel.

5. The system of claim 1, the operations further comprising sending the invitation to a third-party application associated with the first user, wherein the indication of acceptance is received via the third-party application.

6. The system of claim 1, wherein updating the interface further comprises at least one of:

causing display of an indicator associated with the communication channel to be presented in association with a communication channel list associated with the interface; or causing display of the indicator in association with a connections interface section of the interface.

7. The system of claim 1, wherein the communication object channel comprises:

a direct messaging instance.

8. A method comprising:

causing display, on an interface of a client associated with a first user of a communication platform, of an invitation for the first user to communicate with a second user of the communication platform via a communication channel in which a subset of users of the communication platform are authorized to access, wherein the invitation is displayed in association with a received invitations section of the interface;

receiving, from the client associated with the first user, an indication of acceptance of the invitation;

in response to receiving the indication of acceptance and prior to generation of the communication channel, generating a user interface for receiving characteristics associated with the communication channel;

receiving, via the user interface and from at least one of the first user or the second user, the characteristics, wherein the characteristics include a type of the communication channel, an identifier of the communication channel, and one or more privacy settings associated with the communication channel;

based at least in part on the indication of acceptance, generating the communication channel using the characteristics; and updating the interface to indicate acceptance of the invitation, wherein updating the interface comprises removing the invitation from display in association with the received invitations section of the interface and causing an instance of the communication channel to be displayed within an additional section of the interface that is different than the received invitations section of the interface, wherein the communication channel is accessible by the first user via the instance and wherein the additional section of the interface includes instances of other communication channels associated with the first user.

9. The method of claim 8, further comprising:

based at least in part on receiving the indication of acceptance of the invitation, causing display, via the client associated with the first user, of one or more workspaces configured for association with the communication channel;

receiving, from the client, an indication of selection of a workspace of the one or more workspaces for association with the communication channel; and associating the communication channel with the workspace.

10. The method of claim 9, further comprising:

identifying the one or more workspaces associated with a first user account of the first user that are configured for association with the communication channel; and ranking the one or more workspaces in a ranked order based at least in part on second characteristics associated with individual workspaces of the one or more workspaces, wherein the one or more workspaces are displayed in the ranked order.

11. The method of claim 8, further comprising:

based at least in part on receiving the indication of acceptance of the invitation, causing display of a request for the first user to input the characteristics to be associated with the communication channel.

12. The method of claim 8, further comprising sending the invitation to a third-party application associated with the first user, wherein the indication of acceptance is received via the third-party application.

13. The method of claim 8, wherein updating the interface further comprises at least one of:
  causing display of an indicator associated with the communication channel to be presented in association with a communication channel list associated with the interface; or
  causing display of the indicator in association with a connections interface section of the interface.

14. The method of claim 8, wherein the communication channel comprises:
  a direct messaging instance.

15. One or more non-transitory computer readable media storing instructions that, when executed, cause one or more processors to perform operations comprising:
  causing display, on an interface of a client associated with a first user of a communication platform, of an invitation for the first user to communicate with a second user of the communication platform via a communication channel in which a subset of users of the communication platform are authorized to access, wherein the invitation is displayed in association with a received invitations section of the interface;
  receiving, from the client associated with the first user, an indication of acceptance of the invitation;
  in response to receiving the indication of acceptance and prior to generation of the communication channel, generating a user interface for receiving characteristics associated with the communication channel;
  receiving, via the user interface and from at least one of the first user or the second user, the characteristics, wherein the characteristics include a type of the communication channel, an identifier of the communication channel, and one or more privacy settings associated with the communication channel;
  based at least in part on the indication of acceptance, generating the communication channel using the characteristics; and
  updating the interface to indicate acceptance of the invitation, wherein updating the interface comprises removing the invitation from display in association with the received invitations section of the interface and causing an instance of the communication channel to be displayed within an additional section of the interface that is different than the received invitations section of the interface, wherein the communication channel is accessible by the first user via the instance and wherein the additional section of the interface includes instances of other communication channels associated with the first user.

16. The one or more non-transitory computer readable media of claim 15, the operations further comprising:
  based at least in part on receiving the indication of acceptance of the invitation, causing display, via the client associated with the first user, of one or more workspaces configured for association with the communication channel;
  receiving, from the client, an indication of selection of a workspace of the one or more workspaces for association with the communication channel; and
  associating the communication channel with the workspace.

17. The one or more non-transitory computer readable media of claim 16, the operations further comprising:
  identifying the one or more workspaces associated with a first user account of the first user that are configured for association with the communication channel; and
  ranking the one or more workspaces in a ranked order based at least in part on second characteristics associated with individual workspaces of the one or more workspaces,
  wherein the one or more workspaces are displayed in the ranked order.

18. The one or more non-transitory computer readable media of claim 15, the operations further comprising:
  based at least in part on receiving the indication of acceptance of the invitation, causing display of a request for the first user to input the characteristics to be associated with the communication channel.

19. The one or more non-transitory computer readable media of claim 15, the operations further comprising sending the invitation to a third-party application associated with the first user, wherein the indication of acceptance is received via the third-party application.

20. The one or more non-transitory computer readable media of claim 15, wherein updating the interface further comprises at least one of:
  causing display of an indicator associated with the communication channel to be presented in association with a communication channel list associated with the interface; or
  causing display of the indicator in association with a connections interface section of the interface.

* * * * *